(12) United States Patent
Painter et al.

(10) Patent No.: US 9,774,131 B2
(45) Date of Patent: Sep. 26, 2017

(54) FIRE-RESISTANT ELECTRICAL FEEDTHROUGH

(71) Applicant: Teledyne Instruments, Inc., Thousand Oaks, CA (US)

(72) Inventors: David A Painter, Daytona Beach, FL (US); Brandon M Watson, Palm Coast, FL (US); Alexander D Socha, Longwood, FL (US)

(73) Assignee: Teledyne Instruments, Inc., Thousand Oaks, CA (US)

( * ) Notice: Subject to any disclaimer, the term of this patent is extended or adjusted under 35 U.S.C. 154(b) by 0 days.

(21) Appl. No.: 14/979,269

(22) Filed: Dec. 22, 2015

(65) Prior Publication Data

US 2017/0179635 A1    Jun. 22, 2017

(51) Int. Cl.
| | |
|---|---|
| *H01R 13/52* | (2006.01) |
| *H01R 13/527* | (2006.01) |
| *H01R 13/41* | (2006.01) |
| *H01R 13/523* | (2006.01) |

(52) U.S. Cl.
CPC .......... *H01R 13/527* (2013.01); *H01R 13/41* (2013.01); *H01R 13/523* (2013.01)

(58) Field of Classification Search
CPC .... H01R 13/52; H01R 13/521; H01R 13/527; H01R 13/533; H01R 13/523; H01R 13/40
USPC ....... 439/936, 587–589, 271, 281, 201, 426, 439/886, 935, 908
See application file for complete search history.

(56) References Cited

U.S. PATENT DOCUMENTS

| | | | |
|---|---|---|---|
| 3,780,204 A * | 12/1973 | Oliver ............... | H01R 13/5202 174/11 R |
| 3,998,515 A | 12/1976 | Panek | |
| 4,096,983 A | 6/1978 | Beilein et al. | |
| 4,174,145 A * | 11/1979 | Oeschger ............ | H01R 13/521 174/152 GM |
| 4,525,013 A | 6/1985 | Phillips | |
| 4,580,003 A * | 4/1986 | Bowsky ............... | H01B 17/305 174/152 GM |
| 4,598,290 A | 7/1986 | Collins | |
| 5,238,650 A * | 8/1993 | Sheller ................. | F01N 3/2026 219/205 |
| 5,439,392 A * | 8/1995 | Rouhier ................. | G21F 7/005 439/559 |
| 5,588,086 A | 12/1996 | Fan | |
| 5,626,190 A | 5/1997 | Moore | |

(Continued)

FOREIGN PATENT DOCUMENTS

| | | |
|---|---|---|
| EP | 2413435 A1 | 2/2012 |
| EP | 2624369 A1 | 8/2013 |

(Continued)

*Primary Examiner* — Gary Paumen
(74) *Attorney, Agent, or Firm* — Duncan Galloway Egan; Greenwald, PLLC; Kevin T. Duncan

(57) ABSTRACT

The present invention provides a fire-resistant electrical feedthrough system for use in offshore and top-side electrical submersible pump ("ESP") installations. The fire-resistant electrical feedthrough system includes a minimum of two, redundant pressure barriers, in order to provide for safe operation and increased system reliability. The primary barrier is typically embedded within the wellhead equipment structure, while the secondary barrier is typically externally mounted.

30 Claims, 24 Drawing Sheets

(56) References Cited

U.S. PATENT DOCUMENTS

| | | | |
|---|---|---|---|
| 5,642,780 A | 7/1997 | Moore | |
| 5,823,256 A | 10/1998 | Moore | |
| 6,506,083 B1 | 1/2003 | Bickford | |
| 6,530,433 B2 | 3/2003 | Smith | |
| 7,442,081 B2 * | 10/2008 | Burke | B29C 45/14639 |
| | | | 439/589 |
| 7,718,899 B2 * | 5/2010 | Benestad | H01B 17/30 |
| | | | 174/152 R |
| 7,955,105 B2 | 6/2011 | Maeland | |
| 7,959,454 B2 | 6/2011 | Ramasubramanian | |
| 8,097,810 B2 | 1/2012 | Benestad | |
| 8,123,549 B2 | 2/2012 | Jazowski | |
| 8,287,295 B2 | 10/2012 | Sivik | |
| 8,303,312 B2 | 11/2012 | Raad | |
| 8,708,727 B2 * | 4/2014 | Spahi | H01R 13/523 |
| | | | 174/152 GM |
| 8,734,026 B2 * | 5/2014 | Nagengast | E21B 33/0385 |
| | | | 385/147 |
| 8,946,552 B2 | 2/2015 | Li | |
| 8,968,018 B2 | 3/2015 | Sivik | |
| 2006/0079107 A1 | 4/2006 | Allensworth | |
| 2008/0164035 A1 * | 7/2008 | Bolding | E21B 43/25 |
| | | | 166/373 |
| 2009/0114302 A1 | 5/2009 | Yeazel et al. | |
| 2010/0147527 A1 * | 6/2010 | Paulo | F16K 11/065 |
| | | | 166/339 |
| 2011/0021049 A1 | 1/2011 | Ramasubramanian et al. | |
| 2011/0150394 A1 * | 6/2011 | Sorensen | H01R 13/523 |
| | | | 385/53 |
| 2013/0065429 A1 * | 3/2013 | Spahi | H01R 13/523 |
| | | | 439/521 |
| 2013/0084759 A1 * | 4/2013 | Mizuta | H01R 13/03 |
| | | | 439/733.1 |
| 2013/0146355 A1 * | 6/2013 | Strasser | G02B 6/4471 |
| | | | 174/72 A |
| 2013/0183853 A1 * | 7/2013 | Sivik | H02G 3/22 |
| | | | 439/519 |
| 2013/0277067 A1 * | 10/2013 | Emerson | E21B 17/003 |
| | | | 166/378 |
| 2013/0286548 A1 * | 10/2013 | Andrea | H02B 7/00 |
| | | | 361/603 |
| 2014/0112699 A1 | 4/2014 | Lewkoski | |
| 2014/0241810 A1 * | 8/2014 | Lynch | F16L 1/26 |
| | | | 405/170 |
| 2014/0248024 A1 * | 9/2014 | Kimbrell | H02G 15/115 |
| | | | 385/100 |
| 2014/0315425 A1 * | 10/2014 | Maier | H02G 9/02 |
| | | | 439/527 |
| 2014/0335712 A1 | 11/2014 | Semple | |

FOREIGN PATENT DOCUMENTS

| | | |
|---|---|---|
| GB | 2519943 A | 5/2015 |
| WO | 2009134141 A1 | 11/2009 |

* cited by examiner

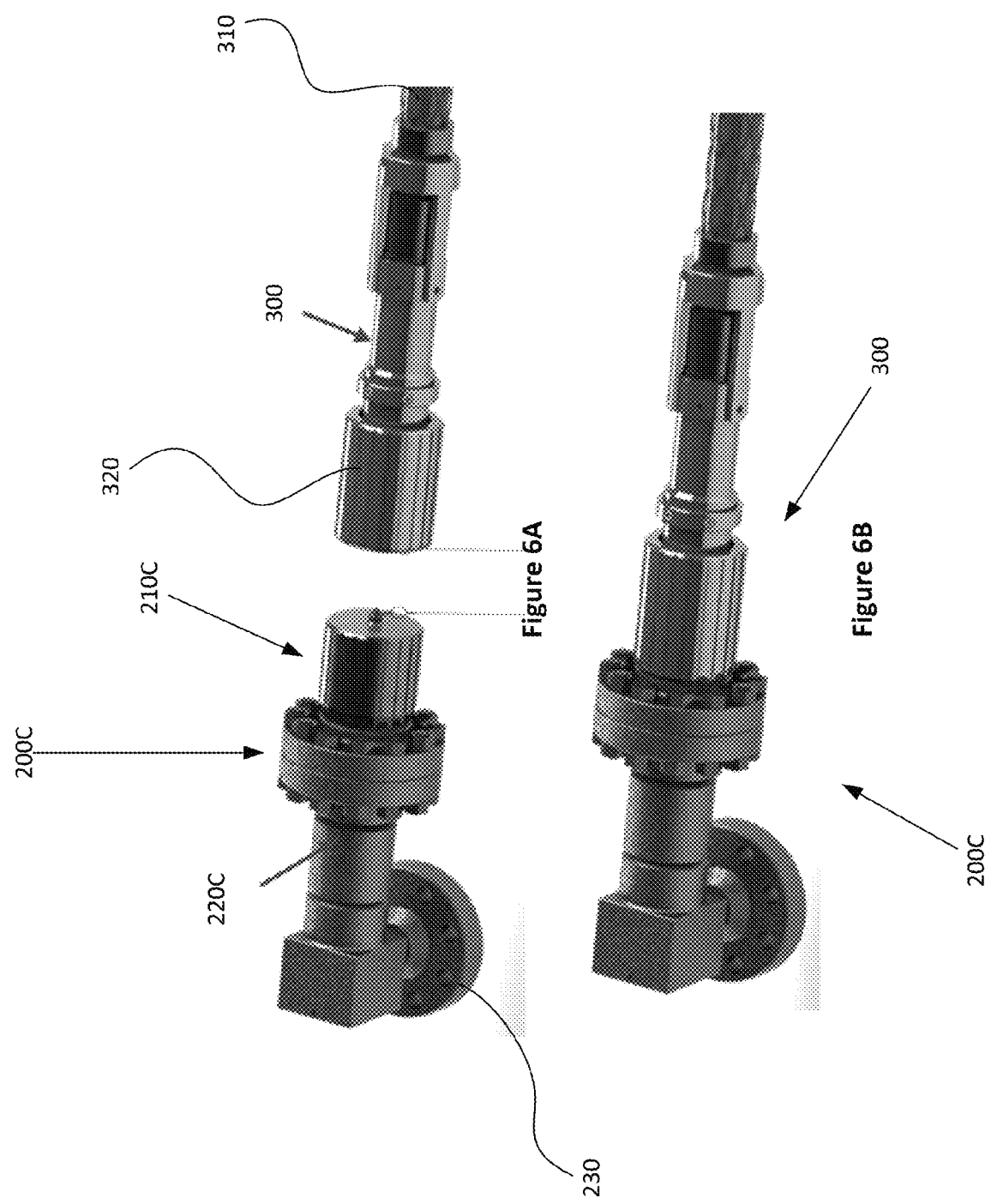

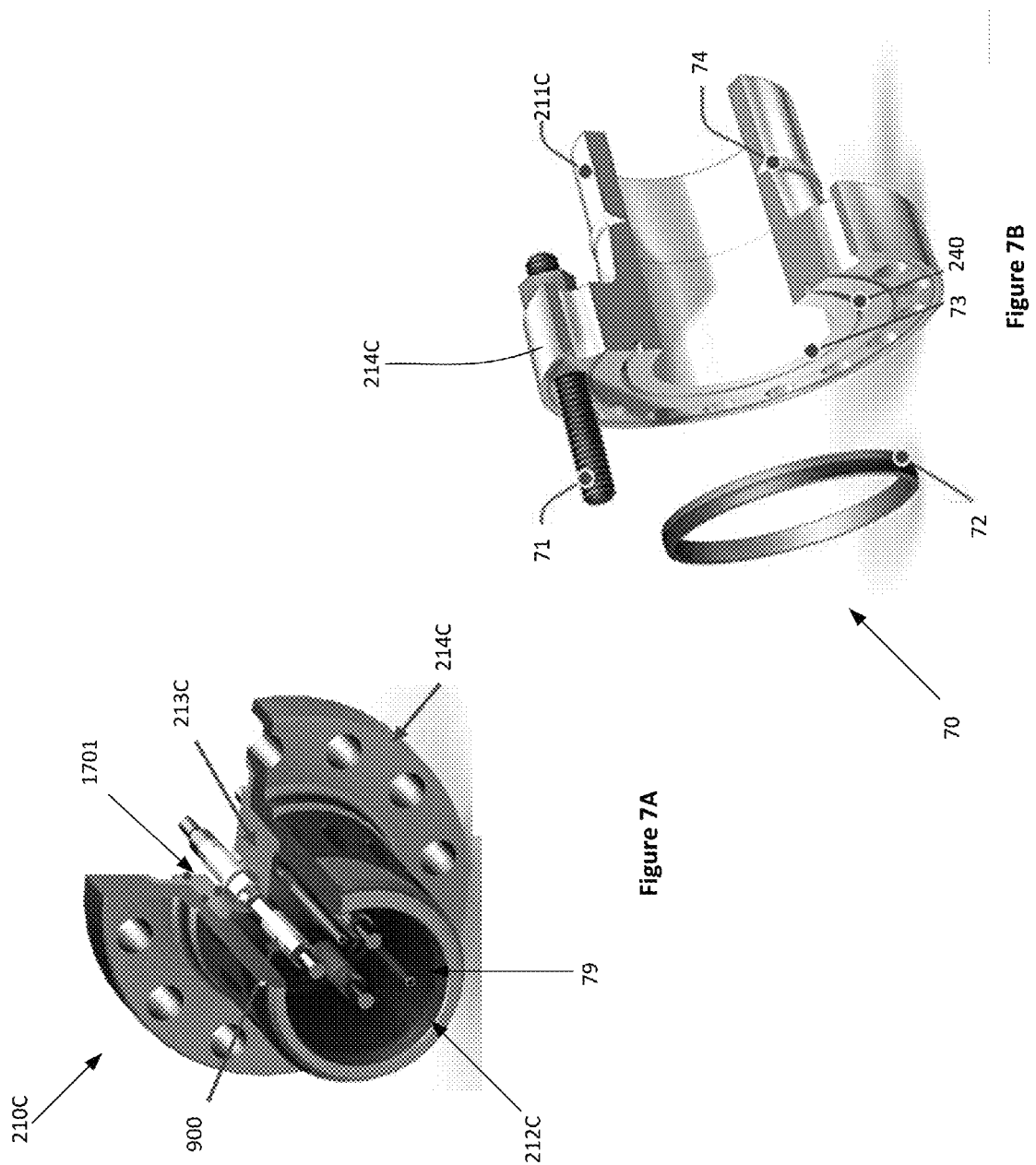

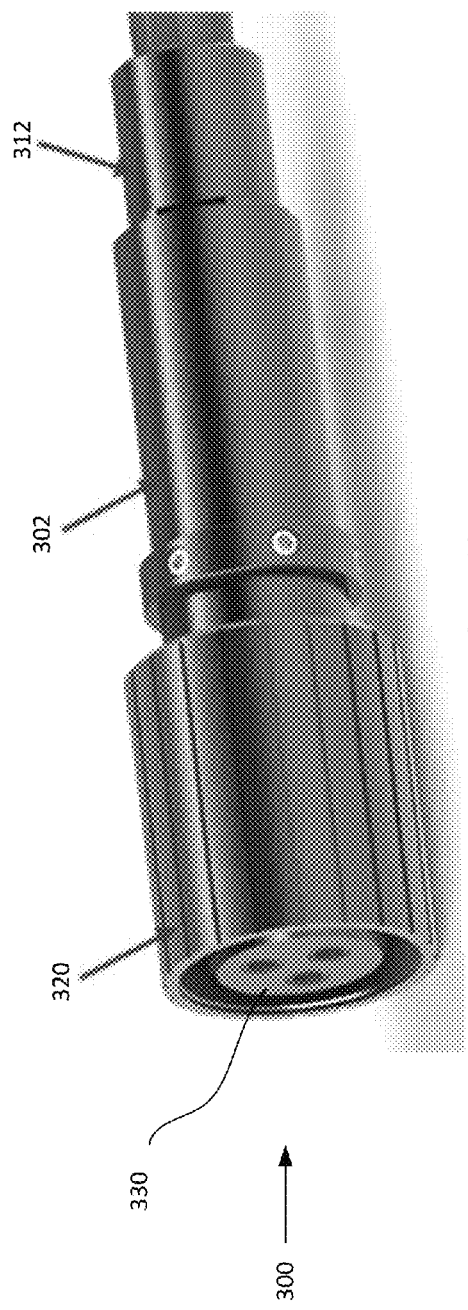
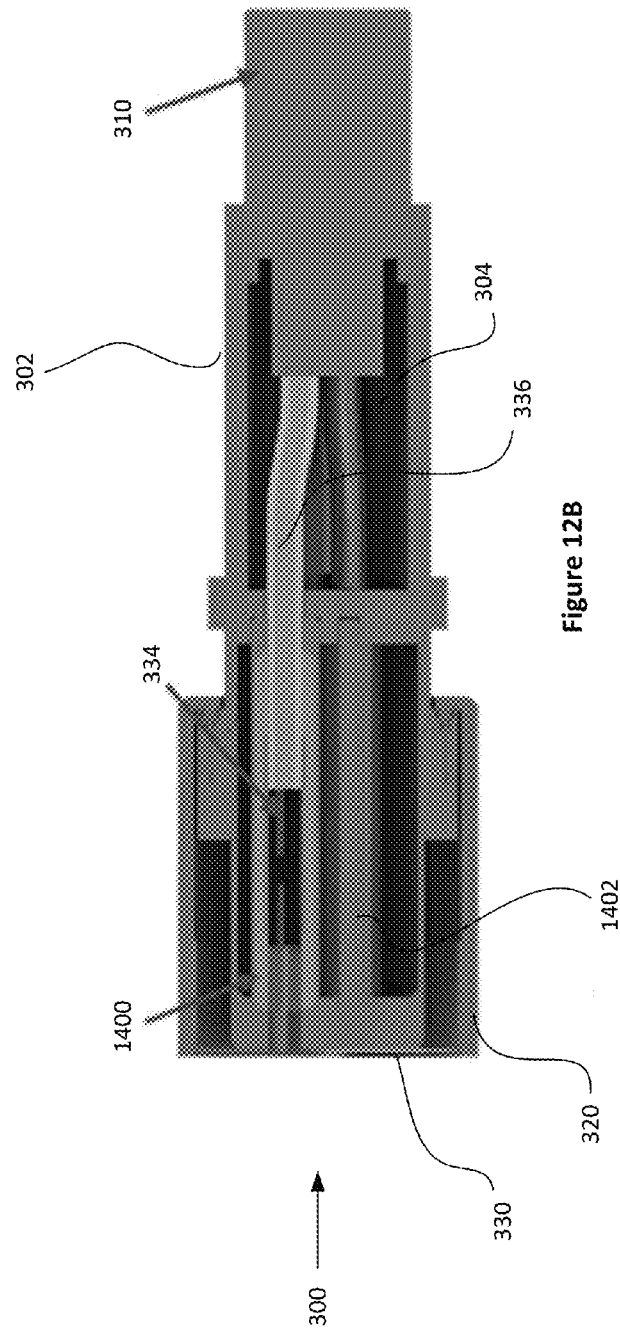

FIRE-RESISTANT ELECTRICAL FEEDTHROUGH

CROSS-REFERENCE TO RELATED APPLICATIONS

The present invention is related to co-pending application U.S. patent application Ser. No. 14/979,296, entitled MODULAR ELECTRICAL FEEDTHROUGH (Painter et al.), which is incorporated by reference herein in its entirety.

FIELD OF THE INVENTION

The present invention relates to offshore and terrestrial power feedthrough systems for electrical submersible pump ("ESP") installations. More specifically, the present invention relates to a fire-resistant electrical feedthrough comprising a set of bulkhead penetrators and sealing elements.

BACKGROUND

In subsea production, electrically operated apparatuses below sea level are typically supplied by power from sea- or land-based host facilities. The power is provided from the external sources to the subsea devices via cable conductors to submerged process control equipment, pumps and compressors, transformers, motors, and other electrically operated equipment. As these components are disposed subsea and are typically enclosed and protected by water-proof pressure vessels, power is provided by means of a cable termination and connector, which may be an electrical penetrator, designed to penetrate and provide power through a bulkhead.

In existing penetrator assemblies, the conductor pin of the penetrator is embedded in an insulator body, which may be seated in a penetrator housing and is sealed against the penetrator housing by means of O-rings, or other types of seals. In downhole applications the electrical penetrator must protect against the egress of production media. At operational pressures at and above several thousand psi the penetrator is subjected to immense differential pressure. This pressure requires a penetrator structure that is adapted to operate despite high differential pressures across seals over a wide range of operating temperatures.

In one embodiment an electrical penetrator may be used to power subsea electric submersible pump (ESP) equipment and the like which pump hydrocarbons in oil well installations, and also in other applications such as high pressure electrical penetrations and other penetrations to provide power to various types of subsea equipment. The penetrator extends through the wall or bulkhead of the vessel in which the equipment is located, and is normally connected to power cables at one end for connecting the equipment to an external power source. In an ESP application, the connection or penetrator cannot be isolated from the pumping pressure for practical reasons. This creates an extreme environment for the connector or penetrator in terms of pressure, temperature, chemical exposure, and high voltage. The penetrator must transfer power to the motor as well as maintain a pressure barrier for internal pressure created by the ESP. The temperatures seen at the reservoir may be increased due to injection fluid temperatures, processing, as well as resistive heating of the electrical elements. For certain topside applications, the penetrators must also be able to resist sustained intense heat from a hydrocarbon fire and maintain seal integrity in high temperature and material stress situations.

In a typical electrical penetrator or feedthrough arrangement, a one-piece conductor such as a conductive connector pin extends through a bore in an insulating sleeve or body, with appropriate seals brazed, bonded, or otherwise mechanically engaged between the outer body and pin at each end of the penetrator assembly. In the case of ceramic penetrators, unique challenges exist in manufacture and subsequent use of the penetrator, due to the different coefficients of expansion of the different materials used in the penetrator assembly. In one known arrangement, the seals comprise metal sealing sleeves which seal the insulating sleeve of ceramic or the like to the conductive connector pin body. When temperature varies from the temperature at which parts were assembled, the parts expand by different amounts due to differences in coefficient of thermal expansion. If not properly managed, the different rates of expansion for the different material parts may induce stress within the assembly, and may lead to failure of the penetration.

Existing systems, apparatuses, and methods for wet- and dry-mate connectors and for electrical penetrators and penetrator assemblies are known and are described in at least U.S. Pat. No. 7,959,454, entitled WET MATE CONNECTOR (Ramasubramanian et al.), U.S. Pat. No. 8,123,549, entitled MULTIPLE LAYER CONDUCTOR PIN FOR ELECTRICAL CONNECTOR AND METHOD OF MANUFACTURE (Jazowski et al.), U.S. Pat. No. 8,287,295, entitled ELECTRICAL PENETRATOR ASSEMBLY (Sivik et al.), and U.S. Pat. No. 8,968,018, entitled ELECTRICAL PENETRATOR ASSEMBLY (Sivik et al.), each of which are incorporated by reference herein in their entirety.

For an electrical feedthrough to operate safely and reliably in a topside environment, what is needed is an electrical penetrator which features structural and electrical insulation elements that are designed to withstand high heat and pressure while maintaining seal integrity, integrity of the electrical insulation system, and electrical continuity.

SUMMARY OF THE INVENTION

This invention provides a fire-resistant electrical feedthrough system for use in offshore and top-side electrical submersible pump ("ESP") installations. The fire-resistant feedthrough system of the present invention may be incorporated into a modular electrical feedthrough system. The design of the present invention allows the bulk of work to be performed onshore in a factory environment, with minimal work being performed offshore/onsite. The present invention provides for increased safety through fire resistance and reduced operational cost by allowing most work to be performed onshore.

Fire resistance is provided by two bulkhead penetrator sealing elements. The first, a ceramic penetrator, is comprised of a ceramic insulator with metalized surfaces to provide electrical stress control, and a two-piece metallic conductor which is sealed to the ceramic insulator by a set of metallic end sleeves. These insulators are sealed into a flange (or other suitable end connector metallic housing) via metallic sealing elements (metal-to-metal seal, braze and/or weld). The temperature envelope of the materials of construction and sealing configuration allows for pressure containment, even when the assembly is wetted by a hydrocarbon fire. The second bulkhead penetrator sealing element is intended to operate sufficiently deep within the equipment to allow for temperatures to drop to manageable levels for traditional thermoplastic, polymeric, or elastomeric sealing elements.

Modularity is achieved through a set of stab-in connectors which make an electrical connection during the installation of a tree cap, or other secondary pressure barrier. Additionally, a dry-mate connector on the outside of the secondary pressure barrier provides for quick connect capability to a junction box, or other power source. The use of a dry-mate connector on the outside of the second barrier provides for power to be physically disconnected without the need to remove the pressure containing penetrator. This system configuration only requires the final cable termination or splice be performed in the field or onsite, allowing for all pressure containing elements, and most high voltage terminations, to be factory installed and tested prior to deployment.

In a first embodiment the present invention provides a fire-resistant electrical penetrator comprising: a body having a first and a second end, the body comprising an insulator; a conductor disposed within the body; a sealing element disposed about the body; and a set of metallic end sleeves disposed at the first and second ends of the cylindrical body, joining the conductor to the body; wherein the conductor extends beyond the first and second ends of the body.

The embodiment may further comprise wherein the body, the metallic end sleeves, and conductor are joined by a combination of brazing and welding processes. The penetrator may further comprise wherein the conductor is a gold-plated, two-piece copper conductor. The penetrator may further comprise wherein the penetrator is assembled in a high vacuum or dry nitrogen environment whereby air is purged from a volume formed within the ceramic electrical penetrator. The penetrator may further comprise wherein the body is substantially cylindrical. The penetrator may further comprise wherein the insulator comprises a ceramic insulator.

In a second embodiment, the present invention provides a fire-resistant feedthrough assembly comprised of: a set of insulated electrical penetrators disposed within a penetrator module, the penetrator module disposed within a penetrator housing, the penetrator housing having a first flange interface; a spool adapter having a second flange interface, the spool adapter joined to the first flange interface of the penetrator housing by the second flange interface, wherein a pressure containment boundary is formed behind the penetrator module; and wherein the spool adapter provides means to mount to a bulkhead or other pressure containing body.

The second embodiment may further comprise wherein the insulated electrical penetrators are welded to the penetrator module and wherein the penetrator module is welded to the penetrator housing. The assembly may further comprise wherein each insulated electrical penetrator in the set of insulated electrical penetrators comprises: a body having a first and a second end, the body comprising an insulator; a conductor disposed within the body; and a set of metallic end sleeves disposed at the first and second ends of the body, joining the conductor to the body; wherein the conductor extends beyond the first and second ends of the body. The assembly may further comprise wherein the body of the insulated electrical penetrator is substantially cylindrical and wherein the insulator comprises a ceramic insulator. The assembly may further comprise an electrical receptacle adapted to mate with the penetrator housing module and form an operative electrical connection with the set of insulated electrical penetrators. The electrical receptacle may further comprise a set of components comprising: a locking sleeve; a termination shell; a cable gland; a power cable pigtail; and a socket contact subassembly. The assembly may further comprise wherein a set of clearances between the set of components of the electrical receptacle prevent the propagation of an explosion or flame front from within the electrical receptacle. The assembly may further comprise wherein the bulkhead comprises a secondary pressure barrier, the secondary pressure barrier comprising a tree cap.

In a third embodiment, the present invention provides a fire-resistant feedthrough assembly comprising: a set of insulated electrical penetrators disposed within a penetrator module, the penetrator module disposed within a penetrator housing, the penetrator housing having a first flange interface; a spool adapter having a second flange interface, the spool adapter joined to the first flange interface of the penetrator housing module by the second flange interface, wherein a pressure containment boundary is formed behind the penetrator module; and an internal penetrator seal assembly comprising: a penetrator; a set of metallic shells; and a set of seals.

The assembly of the third embodiment may further comprise wherein the insulated electrical penetrators are welded to the penetrator module and wherein the penetrator module is welded to the penetrator housing. The assembly may further comprise wherein each insulated electrical penetrator in the set of insulated electrical penetrators comprises: a body having a first and a second end, the body comprising an insulator; a conductor disposed within the body; and a set of metallic end sleeves disposed at the first and second ends of the body, joining the conductor to the body; wherein the conductor extends beyond the first and second ends of the body. The assembly may further comprise wherein the body of the insulated electrical penetrator is substantially cylindrical and wherein the insulator comprises a ceramic insulator. The assembly may further comprise an electrical receptacle adapted to mate with the penetrator housing and form an operative electrical connection with the set of insulated electrical penetrators. The assembly may further comprise wherein the electrical receptacle further is comprises of the following components: a locking sleeve; a termination shell; a cable gland; a power cable pigtail; and a socket contact subassembly. The assembly may further comprise wherein a set of clearances between the set of components of the electrical receptacle prevent the propagation of an explosion or flame front from within the electrical receptacle. The assembly may further comprise wherein the internal penetrator seal assembly is disposed within an equipment assembly and thermally isolated from the penetrator module. The assembly may further comprise wherein the internal penetrator seal assembly is adapted to provide a pressure barrier for a differential pressure. The assembly may further comprise wherein the penetrator of the internal penetrator seal assembly comprises a thermoplastic penetrator. The assembly may further comprise wherein the set of seals of the internal penetrator seal assembly comprise elastomeric seals with overmolded anti-extrusion springs. The assembly may further comprise wherein the internal penetrator seal assembly is secured by a threaded nut. The assembly may further comprise wherein the second flange interface is disposed on a bulkhead, the bulkhead comprising a tree cap and forming a pressure barrier on a casing.

The first, second, or third embodiments may further comprise wherein additional fire and thermal resistance for the set of insulated electrical penetrators is provided by convective cooling, passive insulation, or heat-shielding.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIGS. 6A and 6B provide perspective views of an electrical plug and penetrator assembly, spool adapter, and dry-mate connector receptacle in accordance with the first embodiment of the present invention.

FIG. 7A provides a partial cross-section view of an electrical plug and penetrator assembly in accordance with the first embodiment of the present invention.

FIG. 7B provides a partial cross-section view of the sealing mechanism and flange interface of the penetrator housing module in accordance with the first embodiment of the present invention.

FIGS. 12A and 12B provide perspective (12A) and cross-section views (12B) of a dry-mate connector receptacle in accordance with the first embodiment of the present invention.

DETAILED DESCRIPTION

Figure 1:
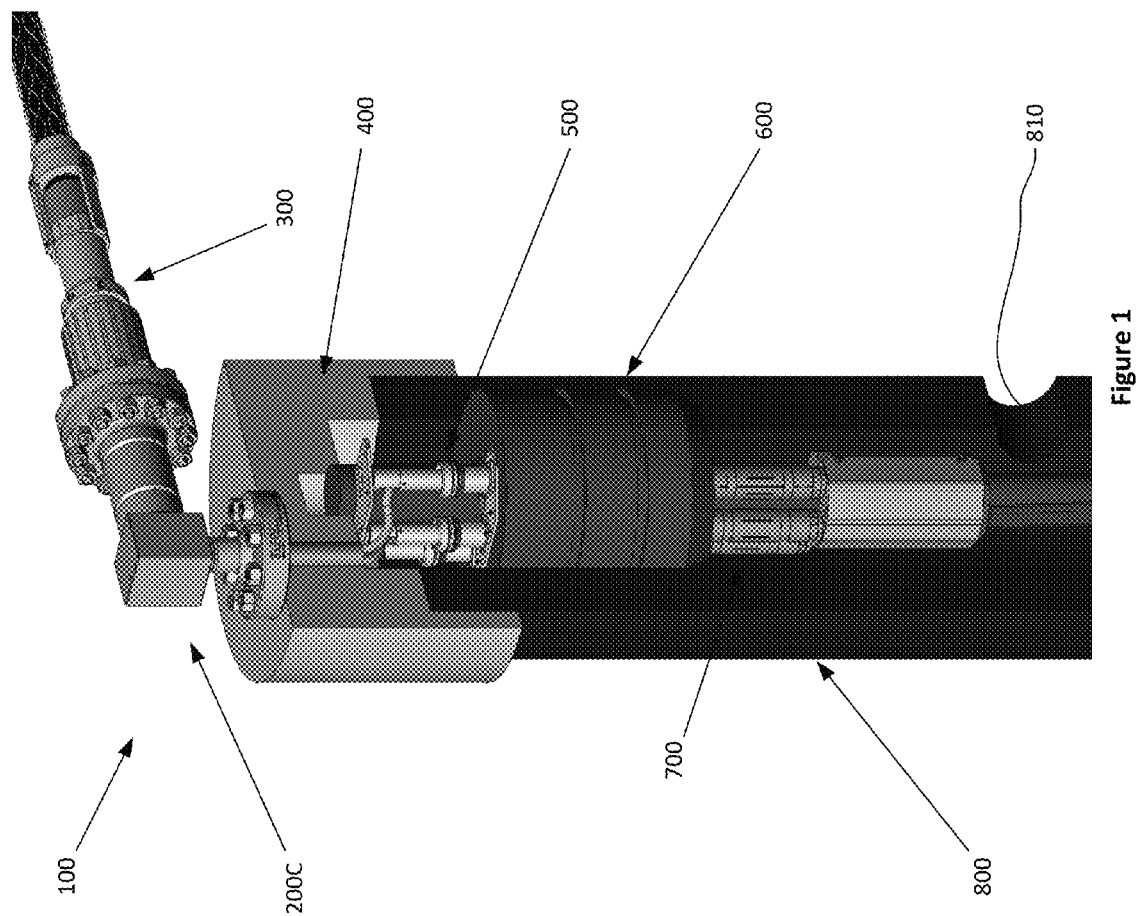
FIG. 1 provides a partial cross-section view of an interconnect system with a fire-resistant electrical feedthrough in accordance with a first embodiment of the present invention.

The present invention will now be described in more detail with reference to exemplary embodiments as shown in the accompanying drawings. While the present invention is described herein with reference to the exemplary embodiments, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

In one embodiment, the present invention provides a fire-resistant feedthrough system having two independent, fire resistant, pressure barriers. The barriers can withstand pressures of several thousand psi and are designed for operation when wetted with produced fluids. The system must provide electrical continuity of up to several thousand volts and several hundred or thousand amperes, as required by the application. In this embodiment, the system comprises a tubing hanger as the primary barrier and a tree cap as a secondary barrier.

The primary barrier, or tubing hanger, is the primary sealing barrier against production fluid egress. Pressure containment and electrical continuity is provided by a bulkhead penetrator, consisting of a conductive metal core insulated by an overmolded insulation, insulation sleeve (plastic or ceramic), or otherwise electrically isolated from the penetrator shells or primary barrier (tubing hanger). The primary barrier is protected from the high temperatures of fire by being sufficiently deep within the structure and/or sufficiently insulated to allow the use of construction materials that are typical for electrical penetrators in the oil and gas and subsea interconnect industries. The penetrator insulation may be thermoplastic, thermoset, fiber-reinforced or a similar plastic material. High temperature materials, such as ceramics or high temperature composites, may be used as warranted by the application (high temperature well fluid, high pressure reservoir, chemical resistance, etc.), but are not required in order to achieve fire resistance of this barrier.

The secondary barrier, or tree cap, is the secondary sealing barrier against production fluid egress. The construction, materials, and penetrator design of the secondary barrier are such that the secondary barrier does not require insulation, heat-shielding or alternative protection methods from heat of flame. The penetrator insulation materials may be ceramic or high-temperature composite materials (e.g., high temperature organic or inorganic polymers, glass ceramic matrices, etc), or other insulation materials which provide suitable electrical insulation performance in normal operation and structural integrity during emergency operation (i.e., temperatures expected during a fire). If a mating connector is implemented, it may be used to supplement the fire resistance of the pressure barrier. The mating connector may also add other capabilities, such as a flameproof or explosionproof interface for compliance with industry specifications for electrical installations in flammable atmospheres. Inherent fire resistance may be supplemented by additional insulation or other protection methods to provide additional safety margins (e.g., increased burn duration or temperatures).

The electrical penetrator used in the secondary barrier is constructed to withstand direct exposure to high temperatures and pressure differentials. The penetrator may comprise a conductive core surrounded by an electrically insulative material. The core and insulation are comprised of material which can withstand pressure loads at expected temperatures during a fire. The sealing interface used in the penetrator can withstand expected temperatures during fire. This is achieved by using metal-to-metal sealing, a high temperature polymer, and/or by brazing or welding to the penetrator housing. In one embodiment, the penetrator may comprise a ceramic insulator and a two piece, telescoping metallic conductor. This configuration provides for differing coefficient of thermal expansion between insulator and conductor. However, the expansion gap must be sized appropriately to allow for structural integrity for an operating temperature range from cold storage (less than or equal to −20° F.) up to several thousand degrees Fahrenheit. The brazed joints are designed to maintain a hermetic seal at pressures of several thousand psi and temperatures expected during fire. To maintain the hermetic seal at these pressures and temperatures, proper alloy selection, proper joint geometry (length of engagement, spacing between sleeves and insulator), and proper specification of joint substrates and surface preparation must be performed. Furthermore, closure welds securing the metal conductor of the ceramic penetrator and the penetrator housing (adapter spool) provide secure metal-to-metal seals.

An embodiment of an electrical penetrator used in the primary barrier may comprise different materials and construction from the electrical penetrator used in the secondary barrier. The penetrator for embedded protection may comprise a metal conductor (copper alloy) overmolded with thermoplastic insulation. The penetrator may be used with common elastomer seals such as seals with overmolded anti-extrusion springs, or seals with anti-extrusion rings. The materials for the seals and penetrator must still be selected to withstand temperatures expected during fire, and degradation of stiffness/strength over the service life (creep, chemical attack, etc.). The electrical penetrator may interface to metal shells or directly to the primary barrier (tubing hanger).

Additional fire and thermal resistance may be provided by using convective cooling, passive insulation, or heat-shielding. Convective cooling may comprise using annulus fluids on the high pressure side and/or a working fluid (water, refrigerant, etc.) on the low pressure side. The fluid circulates through forced or natural convection through a reservoir of colder fluid, preferably with a large thermal mass, and exchanges heat from the area of the penetrator. Passive insulation may comprise glass-fiber insulation, ceramic insulation, etc., and may be a blanket, clamshell, wrap or packing around the penetrator. Passive insulation may also comprise a zone integral to the penetrator housing, providing an inner annulus with low thermal conductivity around the penetrator seals. Heat-shielding may comprise a structure around the penetrator, providing an envelope of air or vacuum around the pressure containing seals.

With respect to FIG. 1, a partial cross-section view of an interconnect system 100 with a fire-resistant electrical feedthrough is provided. The interconnect system 100 is a feedthrough system for delivering power to a downhole ESP. The modularity and fire-resistant features of the interconnect system 100 provide for the installation and operation of downhole ESPs in an offshore environment, while providing for pressure integrity, fire resistance and operation in an explosive atmosphere. The system 100 delivers 3-phase AC power to a downhole ESP, while providing two independent pressure barriers. The depicted system provides for pressure containment up to several thousand psi design pressure and operation in a Zone 1 classified hazardous area.

The system 100 comprises several components including the wellhead plug subassembly 200C, the dry-mate connector receptacle 300, the secondary pressure containing body (tree cap) 400, the wellhead stab assembly 500, the primary pressure containing body (tubing hanger) 600, the tubing hanger penetrator module with cable breakout 700, and casing 800 with production outlet 810. The individual components of the system 100 are described in greater detail in FIGS. 2-24.

Figure 2:
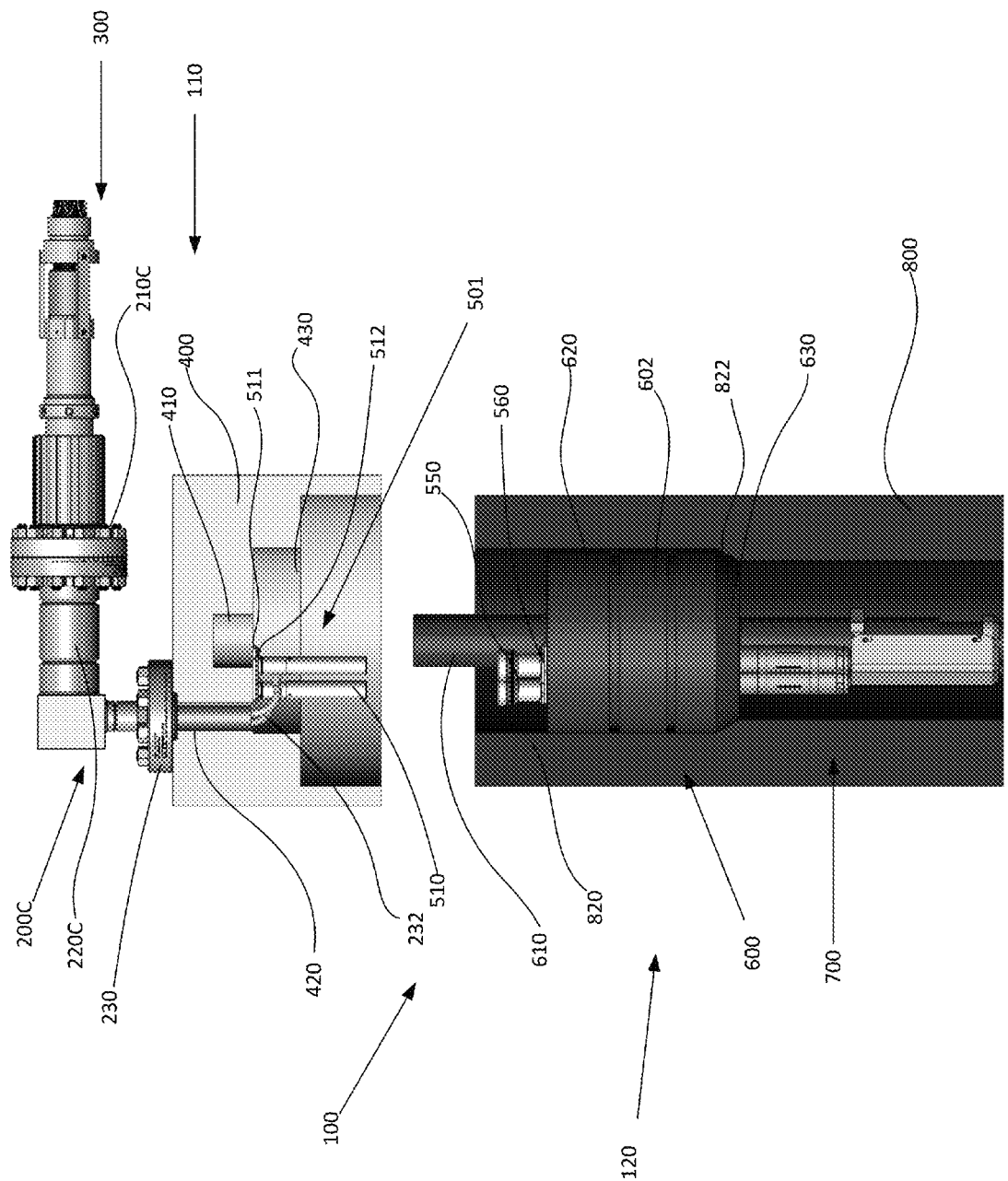
FIG. 2 provides a cross-section view of a secondary pressure containing body, tubing hanger, and casing in accordance with the first embodiment of the present invention.

With reference now to FIG. 2, a cross-section view of the system 100 comprising secondary pressure containing body 400, tubing hanger 600, and casing 800 is provided. Disposed on the outer surface of the secondary pressure containing body 400 is the wellhead plug subassembly 200C. The wellhead plug subassembly 200C provides similar functionality to the wellhead plug subassemblies 200A and 200B provided in FIG. 4, however, the geometry of the spool adapter 220C (depicted in FIGS. 5 and 6) may be preferred in some applications and may offer additional fire and pressure resistance over the spool adapters 220A and 220B. The spool adapters 220A and 220B provide similar if not identical overall function using different geometries determined by the overall envelope of the wellhead to those of spool adapter 200C.

The wellhead plug subassembly 200C comprises the electrical plug and penetrator assembly (penetrator housing module) 210C, the spool adapter 220C, secondary pressure containing body flange interface 230. The flange interface 230 is adapted to mount to a secondary pressure containing body 400, bulkhead, or other supporting surface. A channel 420 through the secondary pressure containing body 400 provides for the connection of the stab receptacle assembly 501 with the wellhead plug subassembly 200C. The stab receptacle assembly 501 comprising the stab receptacle 510 and compliance plate 512 is disposed within the interior 430 of the secondary pressure containing body 400. A space 410 at the center of the secondary pressure containing body 400 helps support and align the tubing hanger 600. A set of pigtails (cables) 232 provides for an operative electrical connection between a set of fire-resistant ceramic electrical penetrators 900 disposed in the interior 212C (shown in FIG. 5) of the penetrator housing module 210C and the stab receptacles 510. The stab receptacles 510 are adapted to mate with the stab plug 530 (shown in FIG. 18) disposed within the guide funnel 550. The guide funnel 550 is disposed on the upper surface of the plate 560 which is in turn disposed on the upper portion 620 of the tubing hanger 600. The body portion 602 of the tubing hanger 600 rests on the ledge 822 of the casing 800 and is disposed in the interior 820 of the casing 800. The body portion 602 may also have a set of grooves or indentations to aid in seal formation and fire-resistance. A set of electrical connections 570 (shown in FIG. 16) forms an electrical connection between the stab plug 530 and the tubing hanger penetrator module 700 through the upper portion 620, body 602, and lower portion 630 of the tubing hanger 600.

The design of the system 100 is modular. The components of the system 100 may be assembled onshore or at another location prior to complete assembly of the system 100 at an offshore or at a remote location. For example, the wellhead plug subassembly 200C and the stab receptacle assembly 501 may be assembled with the secondary pressure containing body 400 to form a secondary pressure containing body assembly 110 at an onshore location and tested for pressure integrity and electrical faults in a controlled factory setting. Similarly, the tubing hanger 600 with tubing hanger penetrator module 700 may be assembled to form a middle assembly 120 and be tested onshore in a manner similar to the secondary pressure containing body assembly 110. For final assembly, the middle assembly 120 may first be installed on the casing 800, and then the secondary pressure containing body assembly 110 may be landed on the middle assembly 120 and casing 800. The modular design provides for the independent testing of the constituent components of the system 100 prior to installation of the component assemblies at the work site. This provides for simpler, or better controlled, processes for assembly, problem identification, and repair.

Figure 3:
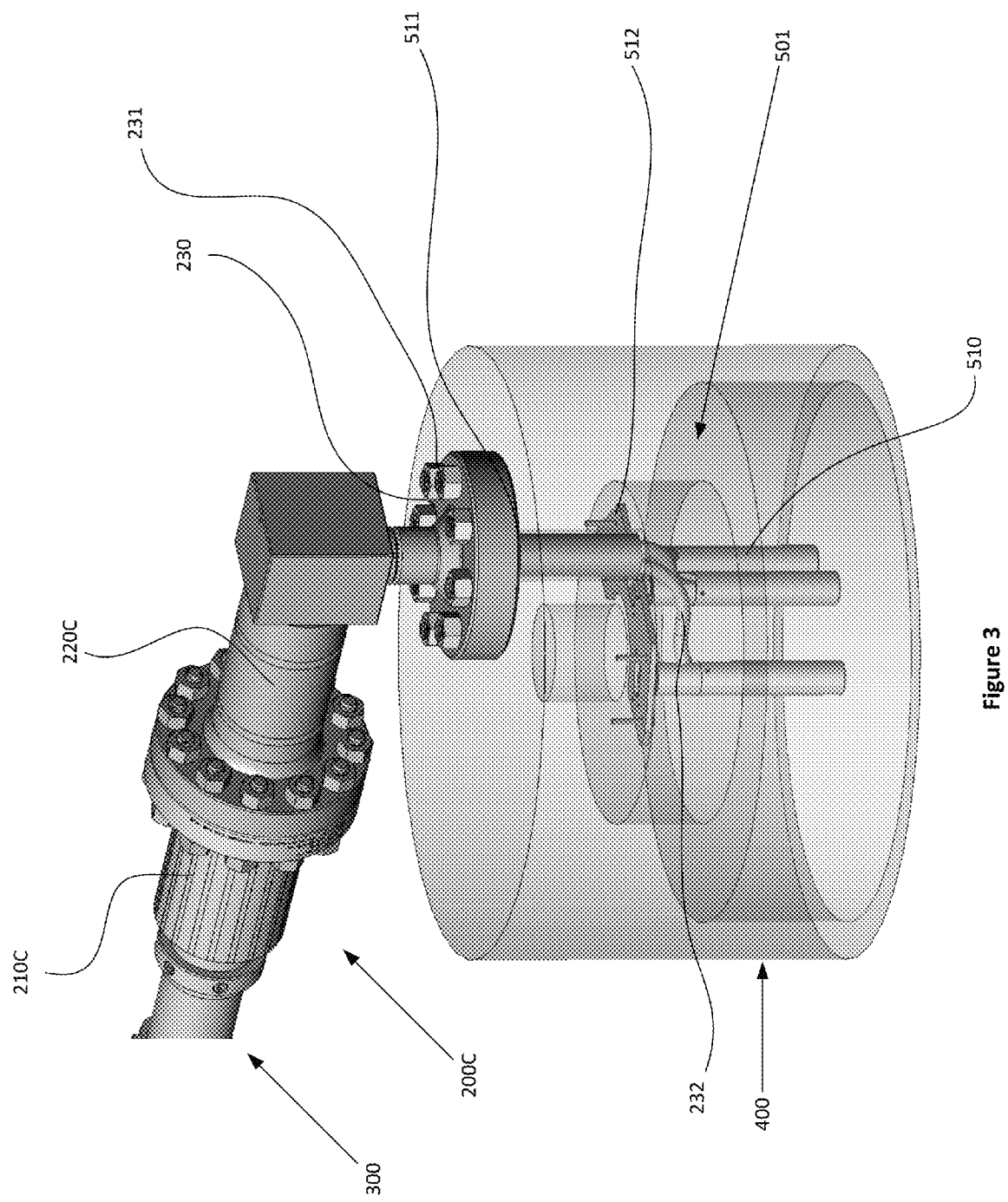
FIG. 3 provides a perspective view of an electrical plug and penetrator assembly, spool adapter, and stab receptacle connector with compliance mount in accordance with the first embodiment of the present invention.

With reference now to FIG. 3, a detailed view of the wellhead plug subassembly 200C and stab receptacle assembly 501 is provided. The wellhead plug subassembly 200C and stab receptacle assembly 501 together with the secondary pressure containing body 400 comprise the secondary pressure containing body assembly 110. The wellhead plug subassembly 200C comprises the penetrator housing module 210C and the spool adapter 220C with flange interface 230. The wellhead plug subassembly 200C includes pigtails 232 that are routed through the secondary pressure containing body to the stab receptacle assembly 501. The secondary pressure containing body assembly 110 may be assembled and functionally tested at an onshore facility prior to final installation or deployment.

In one embodiment, assembly of the secondary pressure containing body assembly 110 is conducted in the following sequence: mount the stab receptacle base 511, route the wellhead penetrator pigtails 232 through the secondary pressure containing body 400, install the wellhead penetrator assembly 501, terminate the pigtails 232 into the stab receptacle 510, and conduct insulation resistance (IR) testing and continuity testing. The secondary pressure containing body assembly 110 assembly continues by installing the stab receptacle assembly 501 onto the secondary pressure containing body 400 as shown in FIG. 2. The first half of the compliance mount plate 512 is first attached to the secondary pressure containing body 400 followed by the stab receptacle base 511.

Figure 4:
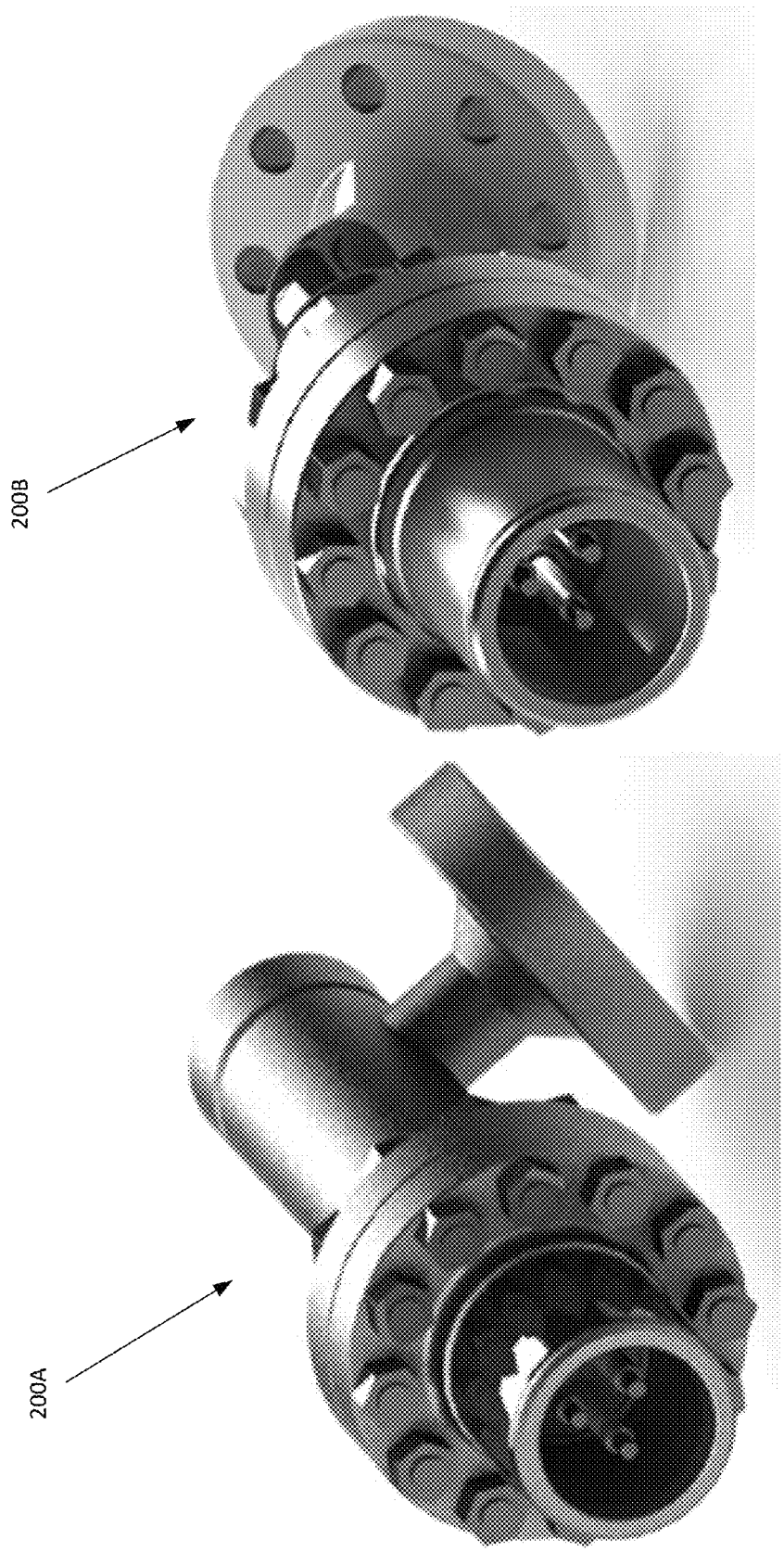
FIG. 4 provides a front perspective view of two embodiments of a penetrator housing module and wellhead spool adapter in accordance with the first embodiment of the present invention.
Figure 5B:
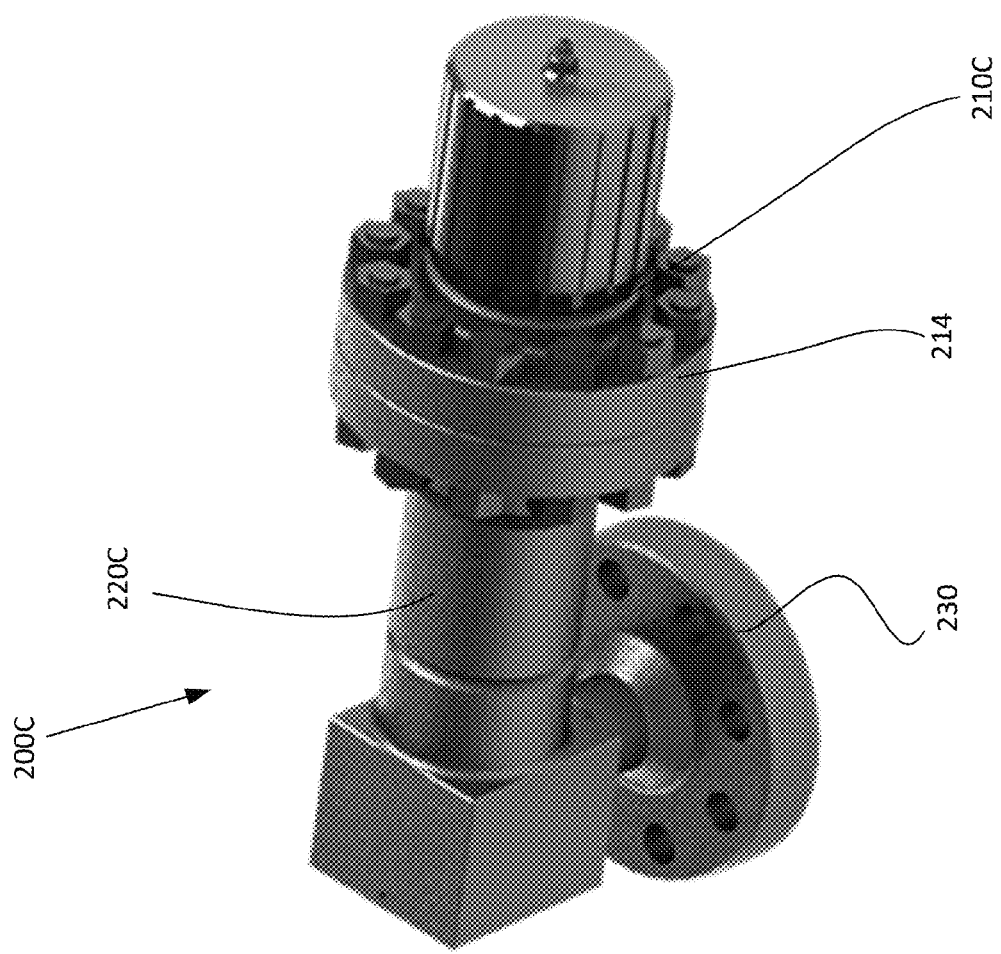
FIGS. 5A and 5B provide front perspective views of a penetrator housing module and spool adapter in accordance with the first embodiment of the present invention.
Figure 5A:
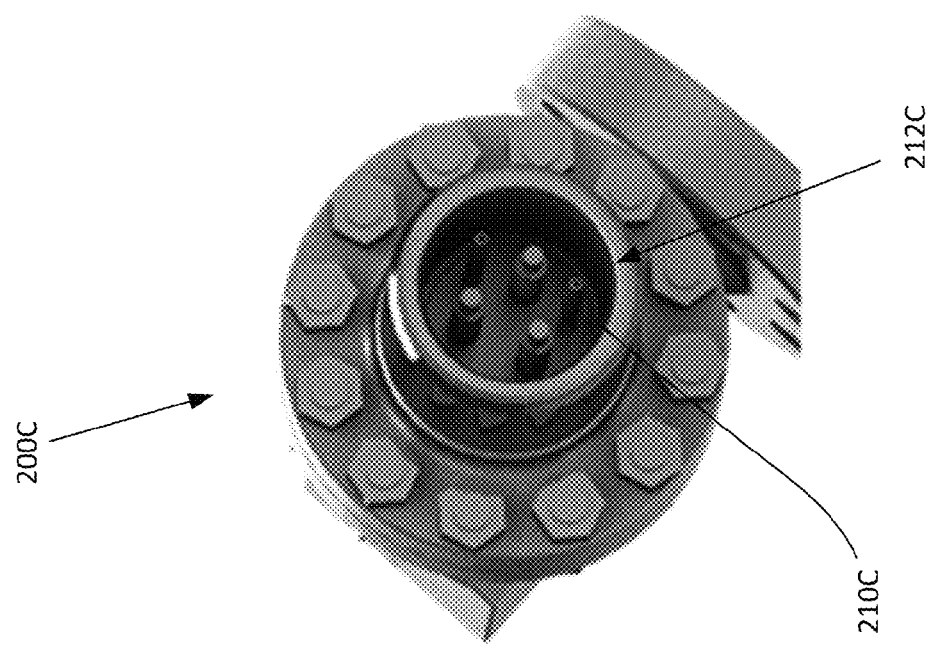

With reference now to FIG. 4, front perspective views of wellhead plug subassembly 200A and wellhead plug subassembly 200B are provided. The wellhead plug subassemblies 200A and 200B provide for alternative exit angles from the wellhead or secondary pressure containing body 400.

With reference now also to FIGS. 5A and 5B and 6A and 6B, the wellhead plug subassembly 200C with dry-mate connector receptacle 300 may be externally mounted to the secondary pressure containing body 400. The wellhead plug subassembly 200C functions as a pressure barrier while providing electrical continuity to the downhole ESP. Additionally, the wellhead plug subassembly 200C provides fire resistance. Additionally, the mating connector pair of the wellhead plug subassembly 200C and dry-mate connector receptacle 300 provides compliance with applicable standards for electrical installations in hazardous locations. The wellhead plug subassembly 200C with dry-mate connector receptacle 300 consists of two primary sub-assemblies, the wellhead plug subassembly 200C and dry-mate connector receptacle 300, shown in FIGS. 6A and 6B.

The wellhead plug subassembly 200C provides pressure integrity and fire resistance, and serves as the electrical plug half of the mating connector. The subassembly, shown in FIGS. 5A and 5B, consists of three primary components: the penetrator module 212C, penetrator housing module 210C and spool adapter 220C. The mating interface between the penetrator housing module 210C and the spool adapter 220C is a flange interface 70, shown in FIG. 7B. The non-standard flange interface 70 incorporates a ring gasket seal 72, and is adapted to a typical Type 6B flange interface.

With reference back to FIGS. 6A and 6B, the dry-mate connector receptacle 300 is secured to the penetrator housing module 210C by the locking sleeve 320. The receptacle pigtail 310 provides an electrical connection from an external power source to the downhole ESP.

With reference now to FIG. 7A, a partial cross-section view of the wellhead plug subassembly 200C is provided. The penetrator module 213C contains the ceramic electrical penetrators 900, and comprises two metallic shells 216C and 217C (shown in FIGS. 10 and 11), which interface to three ceramic electrical penetrators 900, shown in FIG. 8. The ceramic electrical penetrators 900 are joined to the front shell 216C of the penetrator module 213C, by, for example, a combination of brazing and welding processes. The front 216C and rear shell 217C of the penetrator module 213C are subsequently welded together, and welded into the penetrator housing module 210C. The locations of these welds are shown at weld points 1701. The welding, assembly, and configuration of the penetrator module 213C comprising the ceramic electrical penetrators 900, front shell 216C and rear shell 217C provides a single, integral body comprising the penetrator module 213C, ceramic electrical penetrators 900, and penetrator housing module 210A for pressure integrity at the end connection.

With reference now to FIG. 7B, a partial cross-section view of the sealing mechanism 70 and flange interface 214C of the penetrator housing module 210C is provided. The single body formed in the process described above and comprising the penetrator module 213C, ceramic electrical penetrators 900, and penetrator housing module 210C is sealed to the spool adapter 220C by independent metal-to-metal seals, formed by face-to-face metal contact between two flange interfaces 215C and 214C (shown in FIG. 10) and a reusable metal gasket 72. The collar 211C of the penetrator housing module 210C is welded by weld 74 to the flange interface 214C. The inner seal 74 and gasket seal channel 240 with gasket 74 comprise the face-to-face metal contact seal between the flange interface 214C and 215C.

Figure 8:
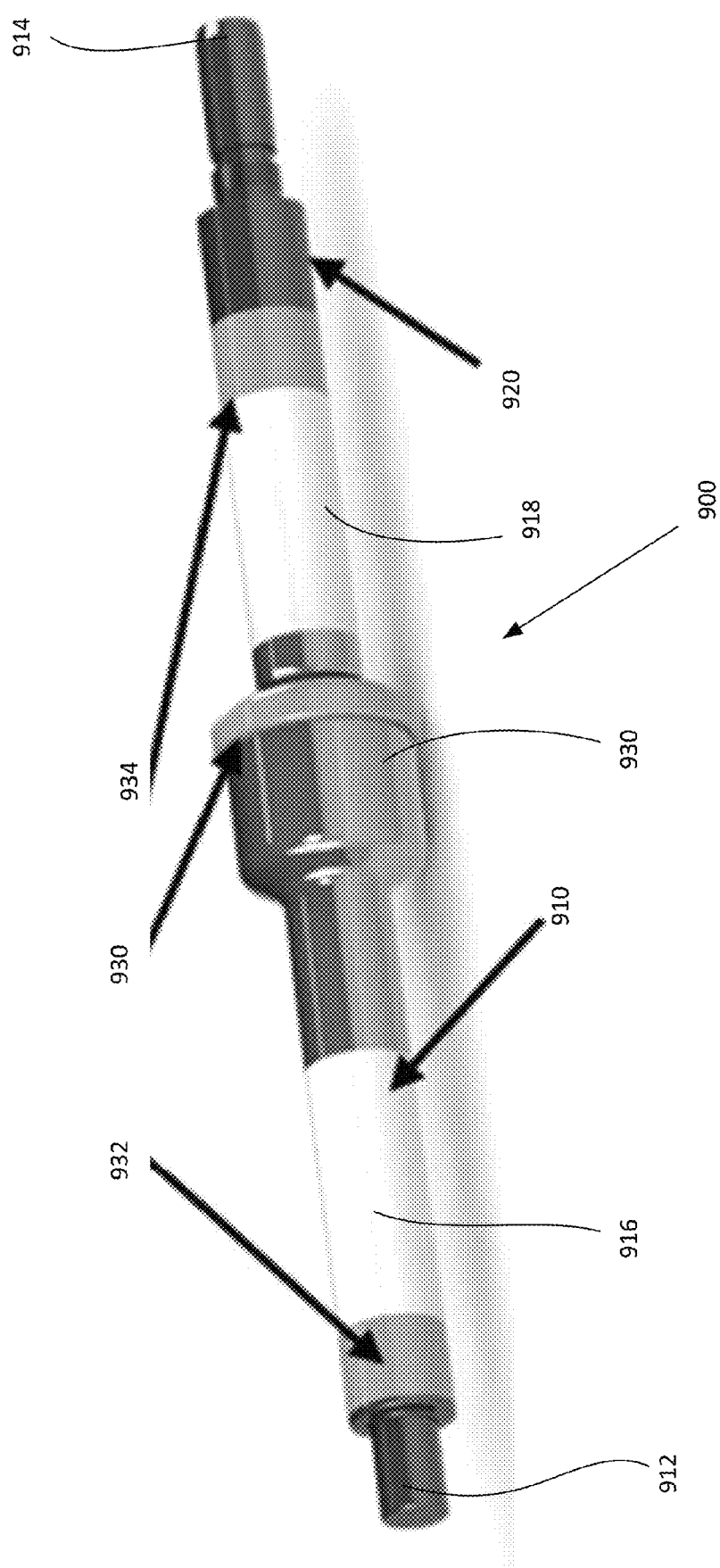
FIG. 8 provides a perspective view of a fire-resistant ceramic electrical penetrator in accordance with the first embodiment of the present invention.
Figure 9:
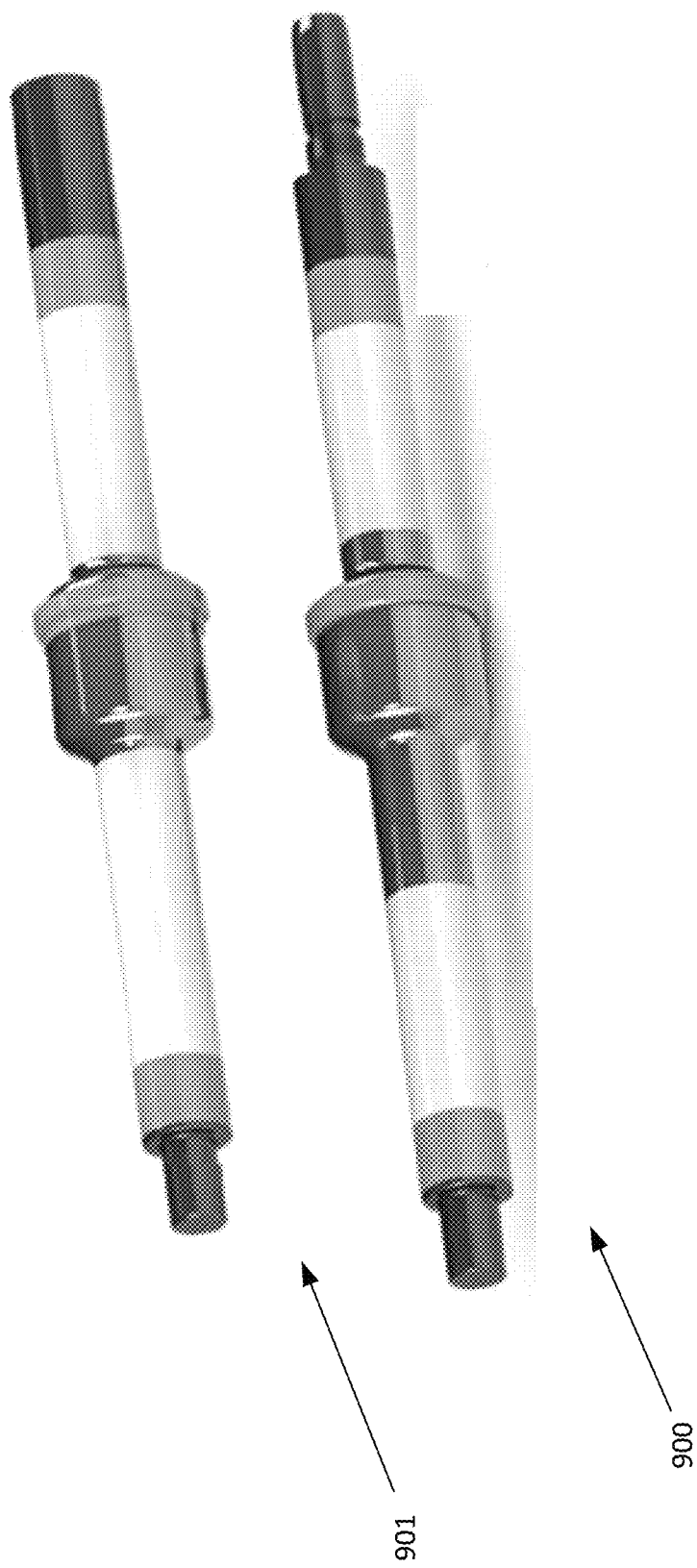
FIG. 9 provides perspective and cross-section views of alternate embodiments of fire-resistant ceramic electrical penetrators according to prior art and the present invention.

With reference now to FIGS. 8 and 9, perspective views of fire-resistant ceramic electrical penetrator 900 and an alternate embodiment penetrator 901 are provided. Each ceramic electrical penetrator 900 comprises a gold-plated, two-piece copper conductor 920, having a first end 912 and a second end 914, that is hermetically sealed into a ceramic insulator 910 via brazing and welding processes. The ceramic insulator 910 may comprise a first body portion 916 and a second body portion 918, or may comprise a single body portion. The ceramic insulator 910 may be substantially cylindrical and may be sealed over and joined to the conductor 920 by a sealing sleeve 930, a first metallic end sleeve 932, and second metallic end sleeve 934 by the brazing and welding processes. Ceramic insulators provide several advantages over polymeric injection molded insulated electrical pins, especially when the pin is acting as a penetrator, where large pressure differentials can exist.

The first advantage of ceramic insulators over polymeric insulation is resistance to failure due to temperature. Typical polymeric insulations are susceptible to significant reduction in mechanical and physical properties at their glass transition temperature, and may have issues with creep over the service life of the penetrator. In contrast, the limiting temperature for the mechanical integrity of ceramic penetrator assemblies, such as for ceramic electrical penetrator 900, is typically dictated by the braze filler and metallic components including the first 932 and second 934 end sleeves, the sealing sleeve 930, and the conductor 920. This allows the ceramic electrical penetrator 900 to withstand temperatures several hundred degrees higher than can be achieved using polymeric insulations, though electrical integrity may be compromised due to other polymeric components in the system, such as cable insulation and boot seals. Additionally, long-term creep effects are eliminated when using ceramic insulators such as insulator 910 and ceramic materials traditionally exhibit better chemical resistance versus traditional polymeric pin insulation materials.

The ceramic electrical penetrator 900 comprises several differences compared to penetrator 901, including different electrical stress control geometry, sealing sleeve geometry and updated electrical contact geometry. The differences between the geometry of the sealing sleeve 930 of ceramic electrical penetrator 900 and geometry of the sealing sleeve 931 of penetrator 901 are shown.

Figure 10:
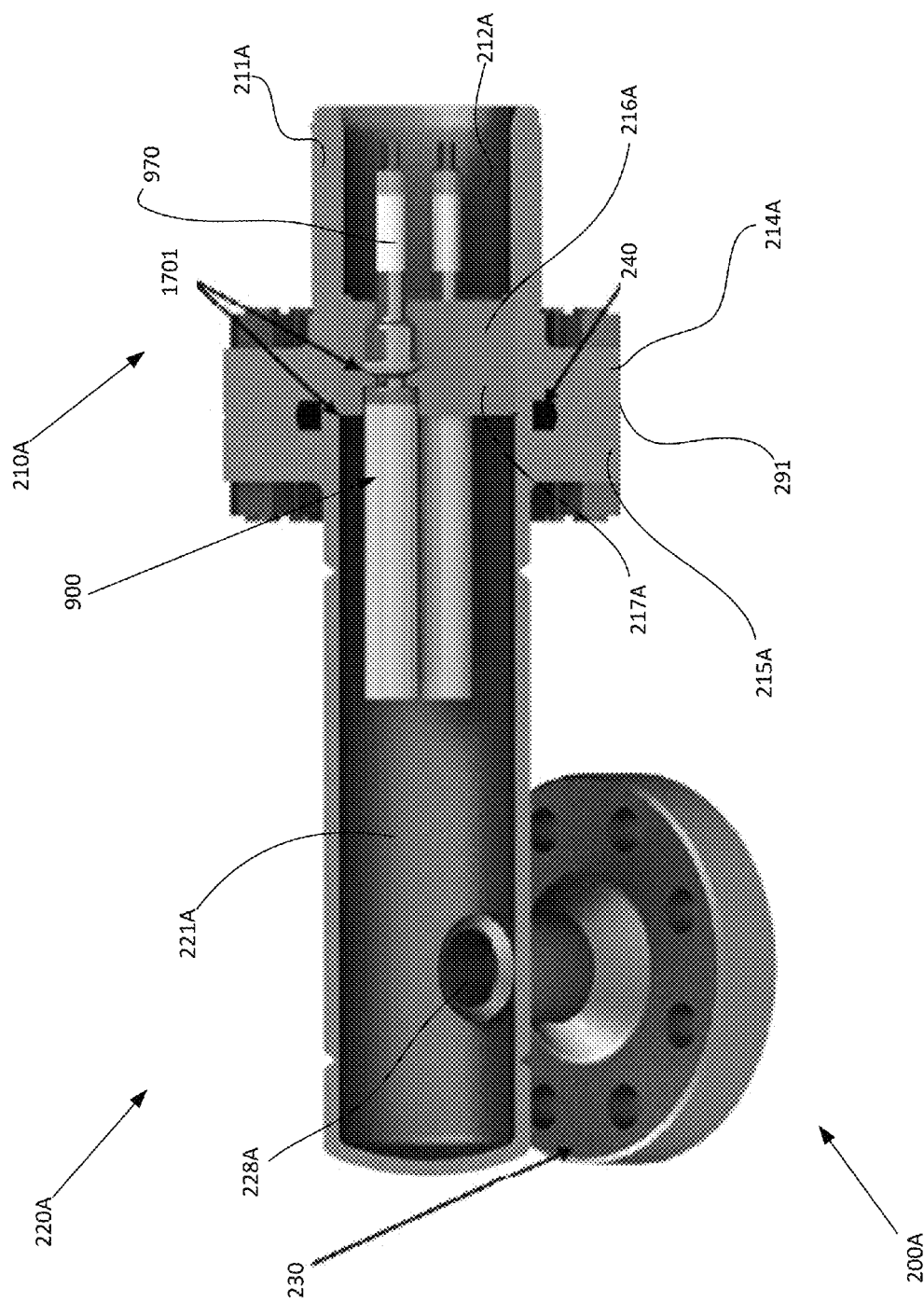
FIG. 10 provides a cross-section view of a wellhead plug and termination shell/spool adapter assembly comprising the penetrator housing module, a set of ceramic penetrators, and wellhead spool adapter in accordance with the first embodiment of the present invention.
Figure 11:
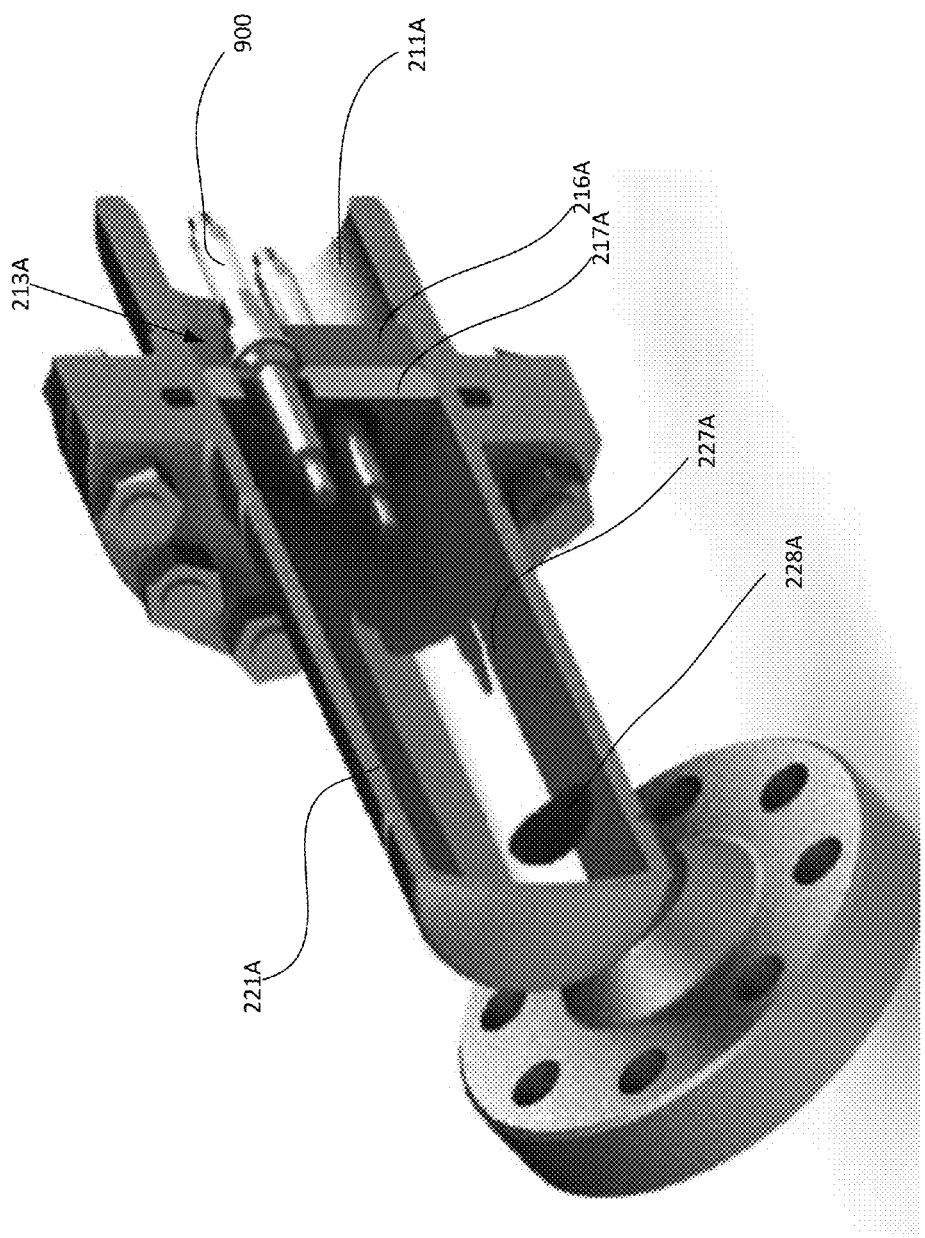
FIG. 11 provides a rear perspective, cross-section view of a wellhead plug subassembly comprising a penetrator housing module, a set of ceramic penetrators, and wellhead spool adapter in accordance with the first embodiment of the present invention.

With reference now to FIGS. 10 and 11, cross-section views of the wellhead plug subassembly 200A comprising a penetrator housing module 210A, a set of ceramic electrical penetrators 900, and a wellhead spool adapter 220A are provided. The front, interfacing portion 970 of the ceramic electrical penetrators 900 in the opening 212A of the penetrator housing module 210A operatively interface with the boot seal 1400 of the dry-mate connector receptacle 300, shown in FIGS. 11 and 13. The spool adapter 220A provides a 90° exit connection from a Type 6B flange interface 230 to a compact flange interface 215A, and is a weldment of simple components comprising pipe 221A, neck 228A, flange interface 230, and flange interface 215A.

In addition to providing pressure integrity under normal conditions, the wellhead plug subassembly 200A must maintain pressure integrity in the event of a fire; this functionality is in compliance with API 6FB, Part II. API 6FB, Part II governs fire testing of end connection for offshore well bay conditions, and requires that the end connection, such as wellhead plug subassembly 200A, under 75% working pressure, be subjected to a 30 minute fire from a single burner at fire point 291 of the penetrator housing module 210A at a measured temperature of 1800° F. Tensile and bending loads may be applied, as applicable. In an alternative embodiment passive fire protection techniques, including but not limited to thermal insulation jackets installed over the wellhead plug subassembly 200A during makeup, may be employed.

The penetrator module 213A, penetrator housing module 210A and spool adapter 220A provide the secondary pressure containing body pressure barrier for the power interconnect system 100; the boundaries of this pressure containment function within the interior area 227A behind the penetrator module 213A and within the spool adapter 221A.

With reference now to FIGS. 12A and 12B, perspective and cross-section views of a dry-mate connector receptacle 300 are provided. The dry-mate connector receptacle 300 provides the quick disconnect functionality of the wellhead plug subassembly 200A and dry-mate connector receptacle 300, as well as compliance with the ATEX directive. Due to the current and voltage applied to the system, a flameproof (Ex d) protection method provided by the Ex d cable gland 312 is implemented in the design for simplicity, since other protection methods, such as intrinsic safety, are not practical for the given energy levels or assembly constraints.

The dry-mate connector receptacle 300 comprises the following primary components: the locking sleeve 320, termination shell 302, Ex d cable gland 312, power cable pigtail 310, socket contact subassembly 330 and boot seal 1400. The individual cables 336 of the cable pigtail 310 separate from the main pigtail 310 in the interior area 304 and are crimped on to socket contact 334 which is adapted to mate with the electrical contact 920 of the interfacing portion 970 of the ceramic electrical penetrator 900.

Figure 13:
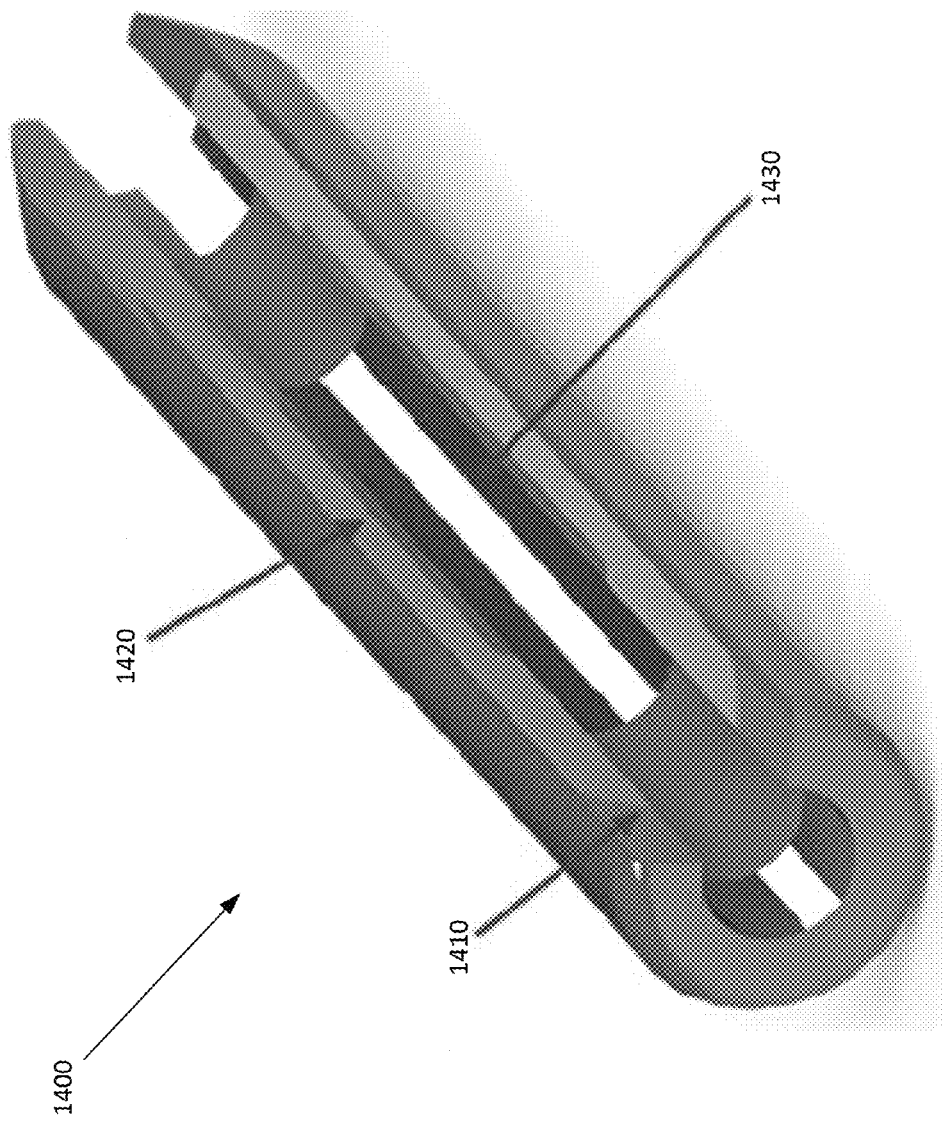
FIG. 13 provides a perspective, cross-section view of a multi-layer boot seal in accordance with the first embodiment of the present invention.

With reference now to FIG. 13, a perspective, cross-section view of the multi-layer boot seal 1400 is provided. Electrical continuity between an external power source and the system 100 is provided by the socket contact 334 of the socket assembly 330 shown in FIG. 12B. The boot seal 1400 comprises an insulating middle layer 1420 and semi-conductive inner layer 1430 and outer layer 1410. The socket assembly 330 crimps directly onto the individual cables 336 of the cable pigtail 310, and interfaces via the socket contact or contact band 334 to the ceramic electrical penetrators 900 in the penetrator housing module 210A. Electrical insulation and stress control are provided by the elastomeric boot seal 1400.

Figure 14:
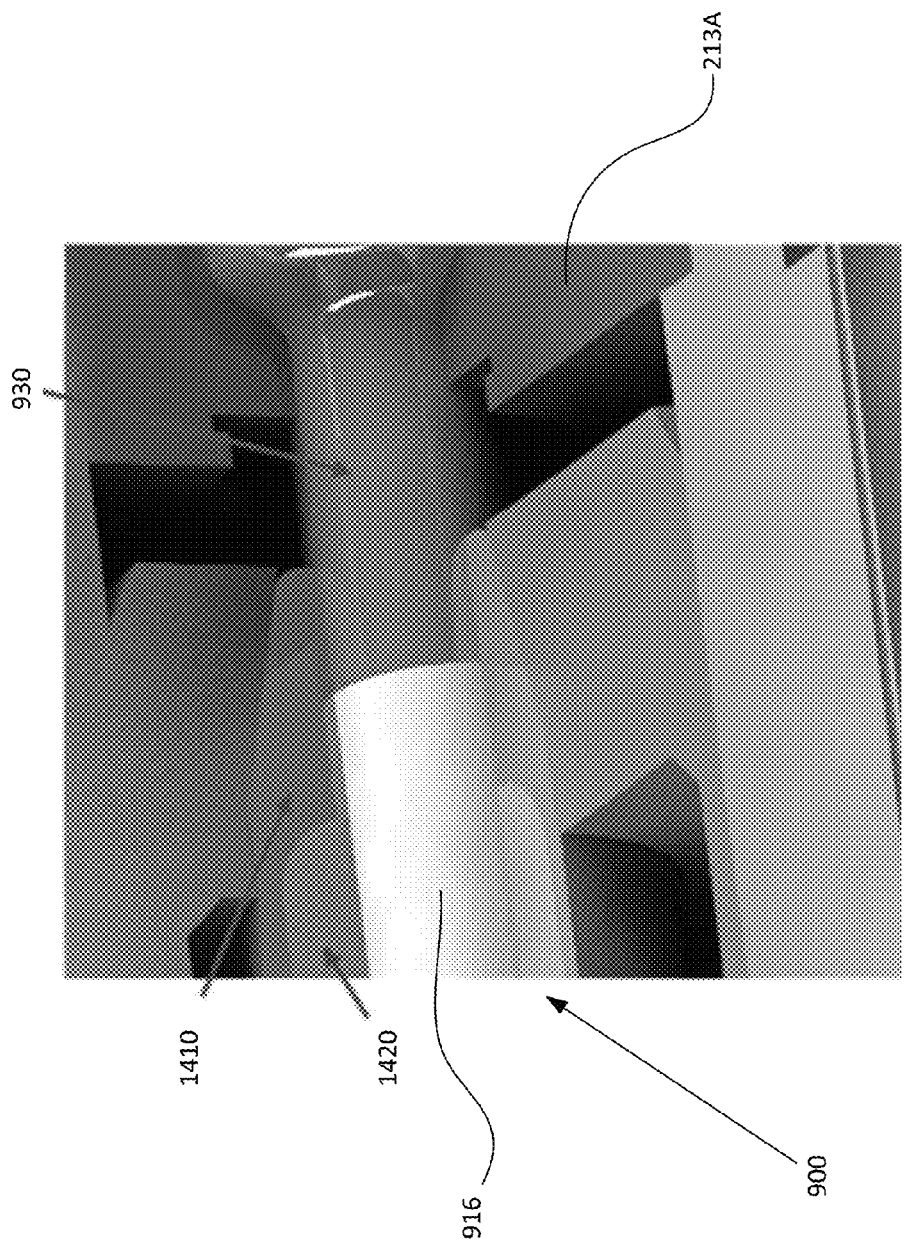
FIG. 14 provides a detailed view of a boot seal interface at the fire-resistant ceramic electrical penetrator in accordance with the first embodiment of the present invention.

With reference now to FIG. 14, a detailed view of the interface between the boot seal 1400 and the fire-resistant ceramic electrical penetrator 900 is provided. The inner semi-conductive layer 1430 of the boot seal 1400 acts as a conductor shield and is intimately bonded to the insulation layer 1420 to prevent partial discharge (PD). The outer semi-conductive layer 1410 acts an insulation shield, maintaining ground plane continuity from the cable insulation screen of the cable 336 to the penetrator housing module 210B. The outer semi-conductive layer 1410 intimately contacts a layer of metallization of the sealing sleeve 932 on the outside of the ceramic insulator 910 of the ceramic electrical penetrator 900. The metallization 930 on the outside of the first body portion 916 of the ceramic insulator 910 of the ceramic electrical penetrator 900 is in direct contact with the penetrator module 213A, which is also grounded through contact with the receptacle locking sleeve 320. Individual phase shielding is not maintained beyond the wellhead plug subassembly 200A.

The flameproof protection of the present invention relies on control of the width and length of all flame paths. In the event of an arc inside the connector, the tight clearances within the dry-mate connector receptacle 300 and penetrator housing module 210A remove energy from the flame front, such that combustion is unsustainable, thus preventing the internal explosion from propagating to the surrounding environment. The flame path control is shown in more detail in FIG. 15.

Figure 15:
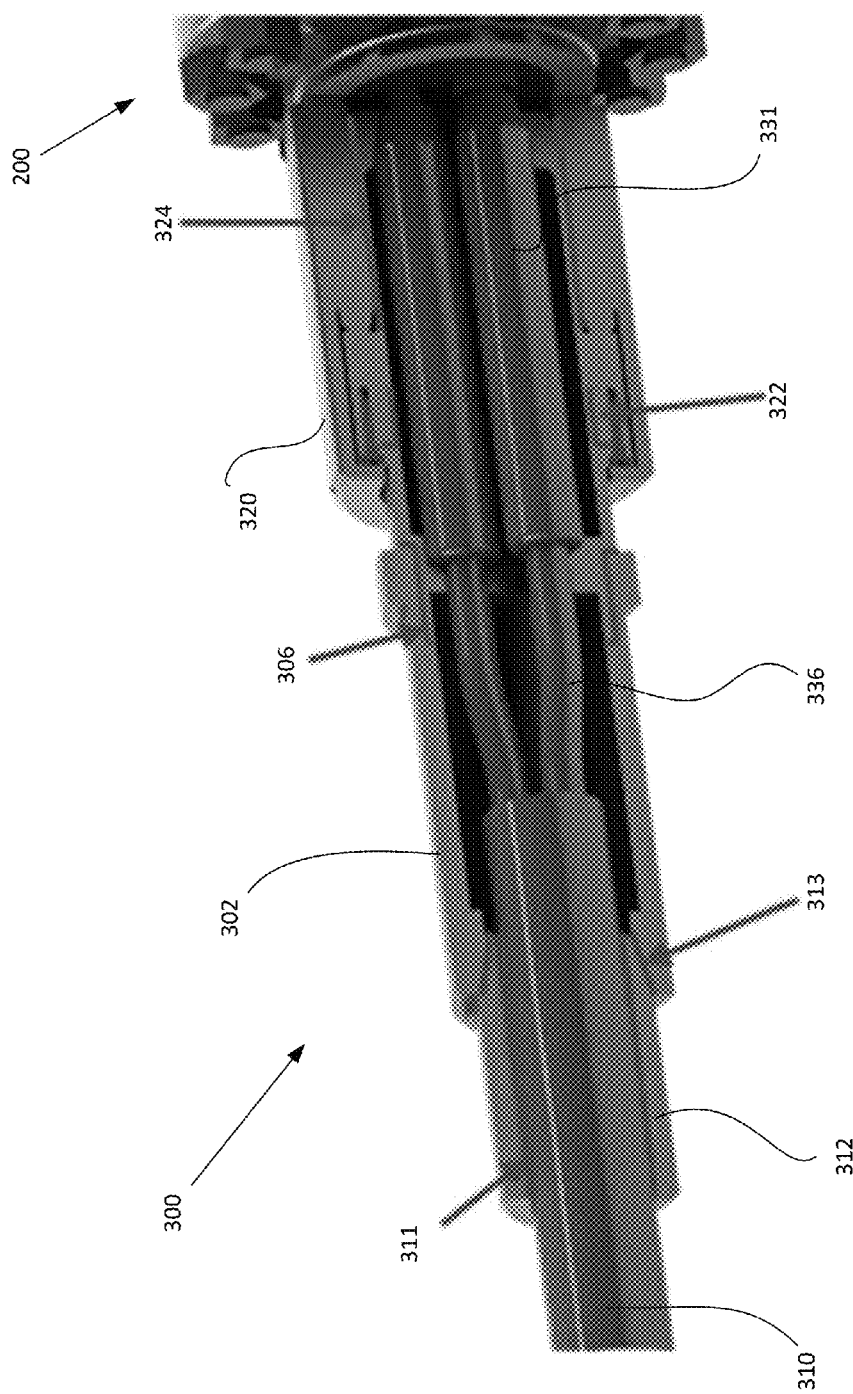
FIG. 15 provides a detailed, cross-section view of a dry-mate connector receptacle operatively engaged with a penetrator housing module in accordance with the first embodiment of the present invention.

With reference now to FIG. 15, a detailed, cross-section view of the dry-mate connector receptacle 300 operatively engaged with the penetrator housing module 210A is provided. Flame path control is maintained at the mating interface between the receptacle and plug 324, between the receptacle shells at 322 and 306 and at the cable entry 313 and 311. The mating interface 324 and the gaps between receptacle shells 322 and 306 are simple lap joints, sized in accordance with EN 60079-1; the cable gland 312 may be a commercially available cable gland for use in hazardous locations. The controlled flame paths, 324, 322, 306, 313, and 311, are at the interfaces between each component in the dry-mate connector receptacle 300 and between the mating interface of the dry-mate connector receptacle 300 and wellhead plug subassembly 200A. The cable gland 312 interfaces to the termination shell 302 at point 313 of the dry-mate connector receptacle 300 via a simple NPT or metric thread interface.

Figure 16:
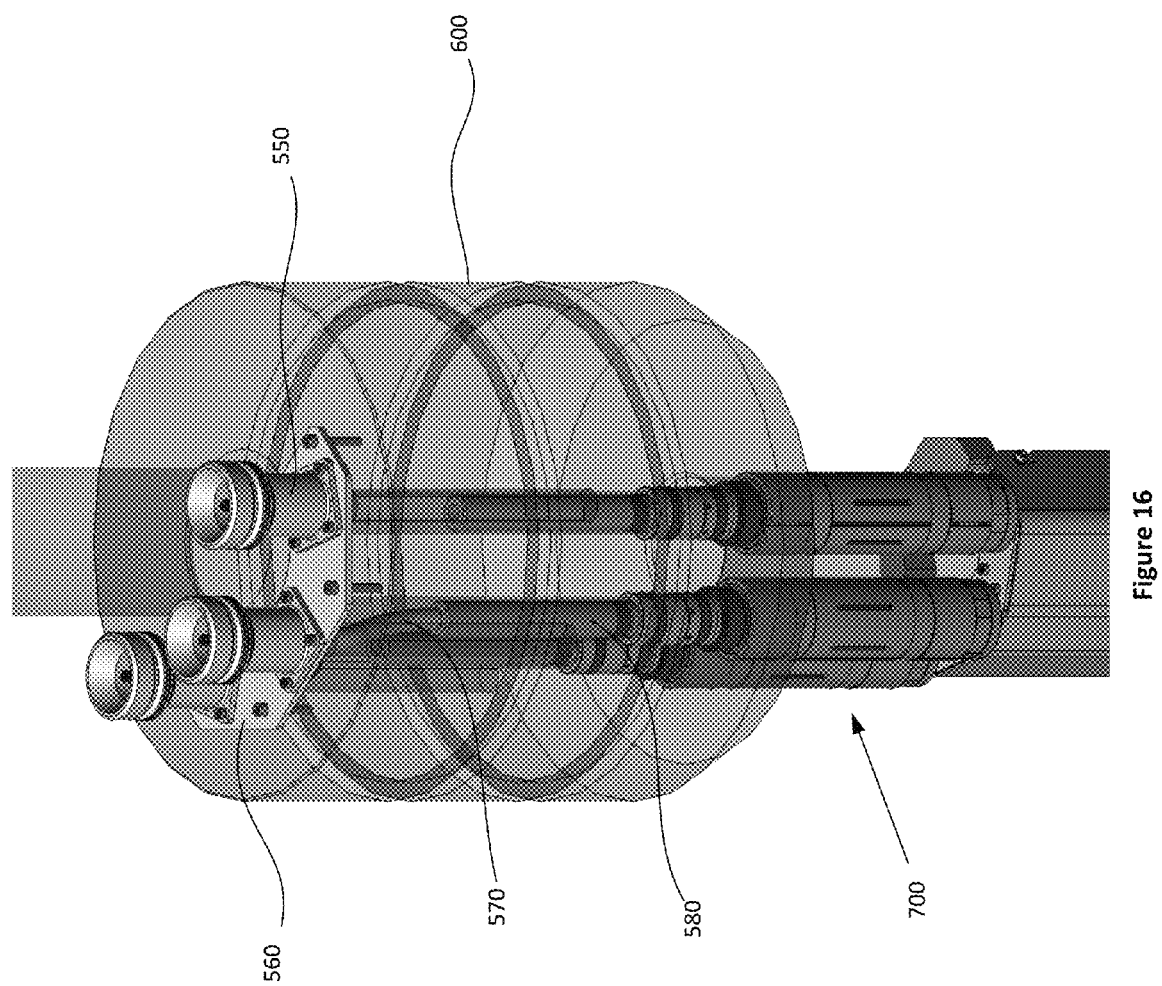
FIG. 16 provides a perspective, cross-section view of a tubing hanger with tubing hanger penetrator module assembly and stab plug in accordance with the first embodiment of the present invention.

With reference now to FIG. 16, a perspective, cross-section view of a tubing hanger 600 with tubing hanger penetrator module 700 and stab plug 530 is provided. The tubing hanger penetrator module 700 is disposed on the bottom of the tubing hanger 600 and terminated to the stab plug 530 (shown in FIG. 18) in the guide funnel 550 which is mounted on the plate 560. The tubing hanger penetrator 700 is terminated to the stab plug 530 and is integrated into the tubing hanger 600 at an onshore facility. The cable pigtail 570 and upper portion 580 of the tubing hanger penetrator 700 join the tubing hanger penetrator module 700 to the stab plug 530.

Figure 17:
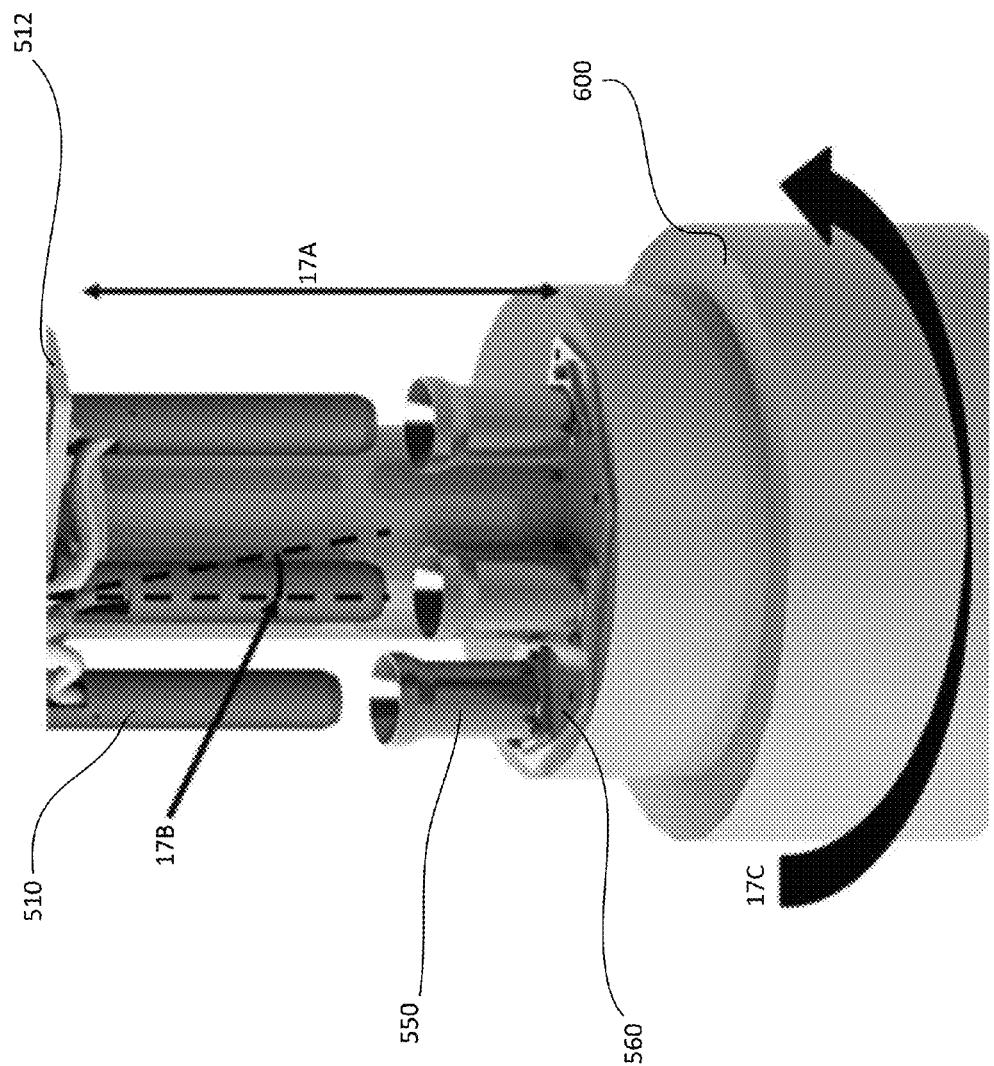
FIG. 17 provides a detailed view of the interface between a set of stab receptacles and a set of stab plugs, illustrating the misalignment tolerance properties of the compliance mount in accordance with the first embodiment of the present invention.

With reference now to FIG. 17, a detailed view of the interface between the set of stab receptacles 510 and set of guide funnels 550, illustrating the misalignment tolerance properties of the compliance mount 512 is provided. The stab receptacle 510 interface to the secondary pressure containing body 400 is a spring-loaded compliance mount 512. The compliance mount 512 provides misalignment tolerances for mating between the stab receptacle 510 and the guide funnel 550 and stab plug 530. Misalignment may be due to manufacturing and installation tolerances, temporary misalignment during secondary pressure containing body 400 landing or due to movement of wellhead components under operational conditions. The expected misalignment tolerances categories for the assembly are listed in Table 2 and the orientation is shown in FIG. 17. The axial tolerance 17A is compensated for by the spring loaded mounting plate 512. The rotational tolerance 17C is compensated for by the guide funnel 550 and slotted mounting plate 511. The angular tolerance 17B is compensated for by the guide funnel 550, slotted mounting plate 511, and spring loaded mounting plate 512.

TABLE 1

| Orientation | Mechanism |
| --- | --- |
| Axial | Spring loaded mounting plate |
| Rotational | Guide funnel |
|  | Slotted mounting plate |
| Angular | Guide funnel |
|  | Slotted and spring loaded mounting plate |

Figure 18:
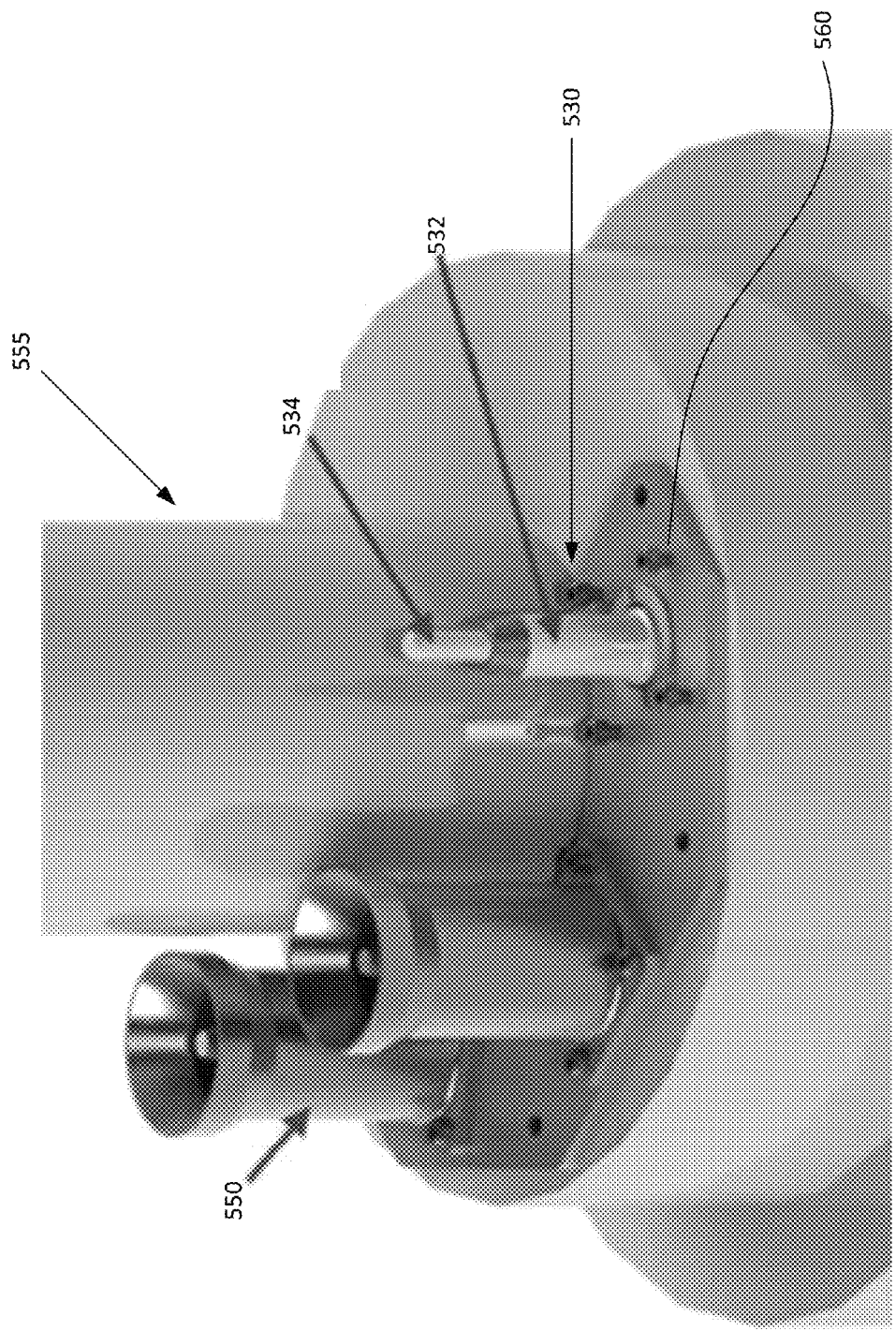
FIG. 18 provides a detailed view of the stab plug subassembly in accordance with the first embodiment of the present invention.

With reference now to FIG. 18, a detailed view of the stab plug subassembly 555 is provided. The stab plug 530 mounts to the top of the tubing hanger 600, and comprises alignment funnels 550 which provide fine alignment during mating. A simple male electrical contact 534 is crimped onto the end of the pigtail 570 from the tubing hanger penetrator module 700. Electrical insulation and stress control is provided by a boot seal 532 that is installed after crimping.

Figure 19:
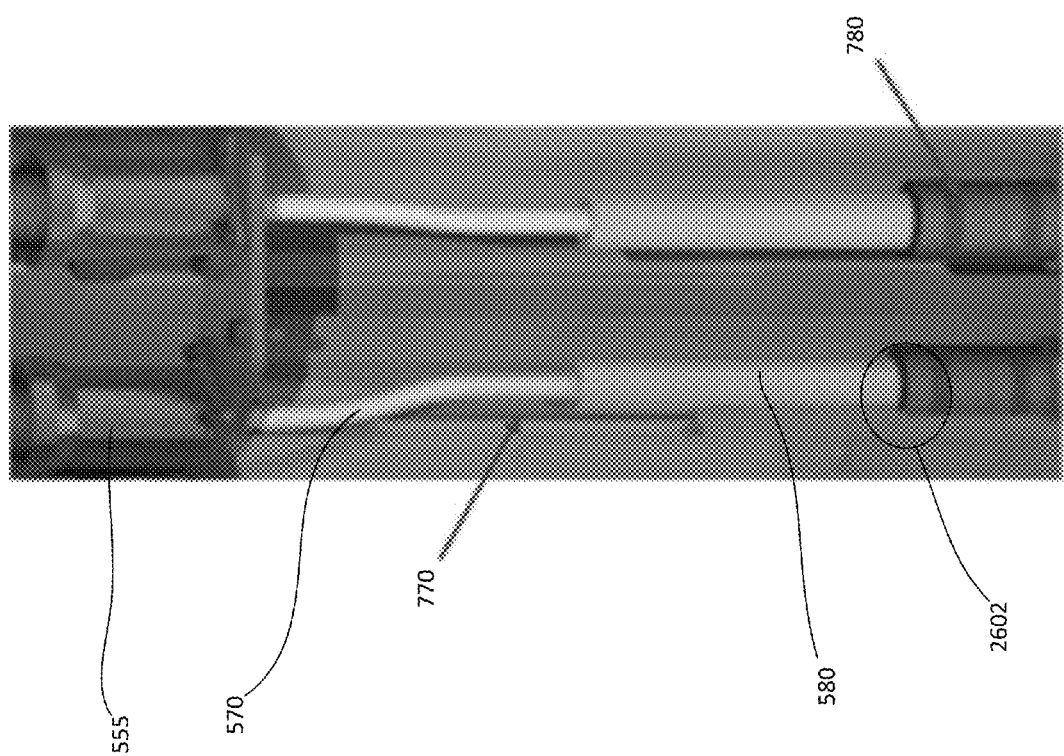
FIG. 19 provides a perspective, cross-section view of the stab plug subassembly within the tubing hanger in accordance with the first embodiment of the present invention.

With reference now also to FIG. 19, which provides a perspective, cross-section view of the stab plug subassembly 555, the interface between the tubing hanger penetrator module 700 and stab plug subassembly 555 can be seen in greater detail. The design of the boot seal 532 includes a positive retention feature to keep the contact 534 in place during mating and operation, however, the stab plug 530 does not function as a seal at the top of the tubing hanger 600. In order to mitigate water pooling on top 580 of the tubing hanger penetrator module 700, the cavity 770 below plug is to be filled with a substance more dense than water. Additionally, the materials comprising the upper portion 580 and tubing hanger penetrator seal assembly 780 are compatible with typical application fluids, further minimizing the risk of water pooling on top of the termination.

Figure 20:
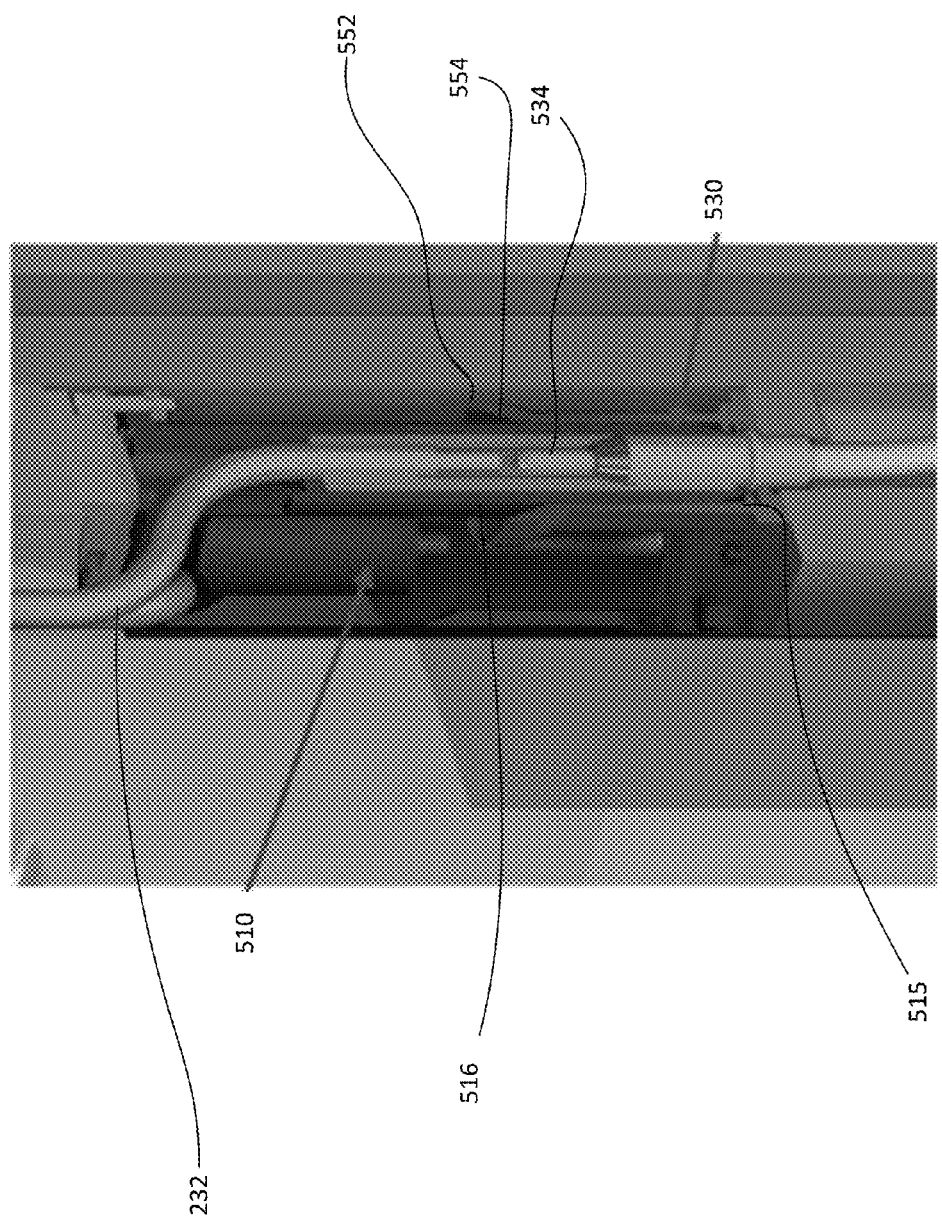
FIG. 20 provides a perspective, cross-section view of the interface between a stab receptacle and a stab plug in accordance with the first embodiment of the present invention.

With reference now to FIG. 20, a perspective, cross-section view of the interface between a stab receptacle 510 and a stab plug 530 is provided. The wellhead stab assembly 500 is a mating connector pair of stab receptacle 510 and stab plug 530 which provides an electrical interface between the secondary pressure containing body 400 and tubing hanger 600. The stab receptacle connector 510 mates as the secondary pressure containing body 400 is landed and relies on the installed position of the secondary pressure containing body 400 relative to the tubing hanger 600 to prevent the connector pair, stab receptacle 510 and stab plug 530, from separating. When mating, the exterior 516 of the stab receptacle 510 abuts the bottom 515 of the interior 554 of the guide funnel 550. The flared outer edge 552 of the guide funnel 550 aids in secure mating of the stab receptacle 510 with the stab plug 530. The pigtail 232 forms an electrical connection with the contact 534 when mated. The stab receptacle 510 is mounted to the secondary pressure containing body 400, and connects to the penetrator housing module 210A via the flexible pigtail/cable 232. The stab plug 530 is mounted to the top of the tubing hanger 600, and is terminated to a flexible cable pigtail 570 from the upper portion 580 of the tubing hanger penetrator module 700.

Figure 21B:
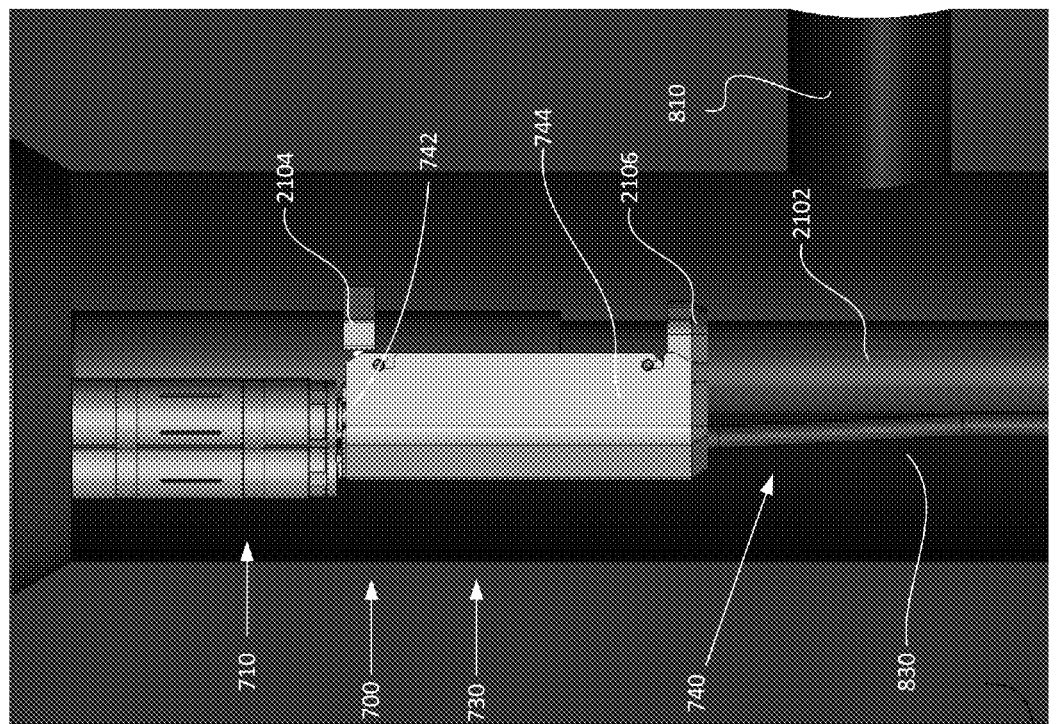
FIGS. 21A and 21B provide front (21A) and side (21B) views of an assembly comprising a tubing hanger penetrator, cable breakout, ESP cable, and casing in accordance with the first embodiment of the present invention.
Figure 21A:
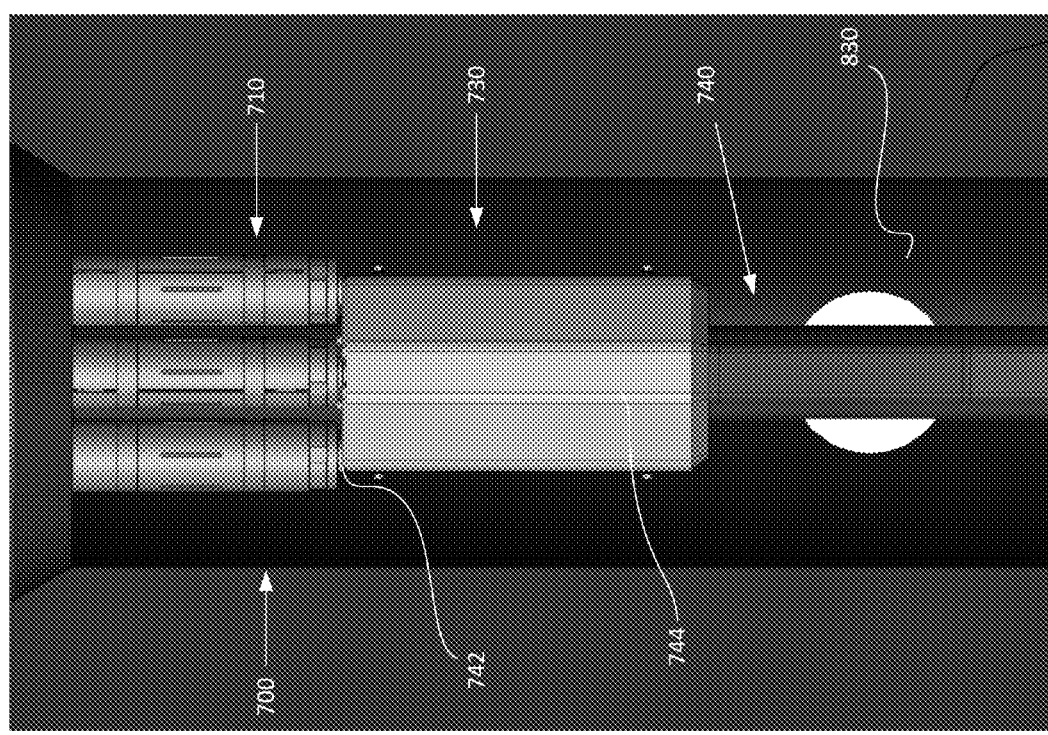

With reference now to FIGS. 21A and 21B, a front and side view respectively of a tubing hanger penetrator 710, cable breakout box 730, ESP cable 740, disposed in the production bore 830 of the casing 800 are provided. The tubing hanger penetrator 710 with cable breakout box 730 provides pressure integrity and electrical continuity and integrity at the termination of ESP cable 740, and provides mechanical protection for the ESP cable 740 in the production bore 830 which has the polymeric sheath or galvanized armor removed. The assembly 700 is designed such that all major components are situated above the production outlet 810 to minimize interference with production flow and avoid exposure to turbulent flow due to the 90° turn at the production outlet. The breakout box 730 receives the individual cables 742 from the tubing hanger penetrators 710. The housing 744 of the breakout box 730 protects the ends 742 of the ESP cable 740 as they enter the tubing hanger penetrators 710. The breakout box 730 is disposed on the shaft 2102 and is held in place by upper 2104 and lower 2016 securing mounts. The breakout box 730 may be landed or installed on the upper and lower securing mounts 2104 and 2016 after the mounts have been installed on the shaft 2102.

Figure 22:
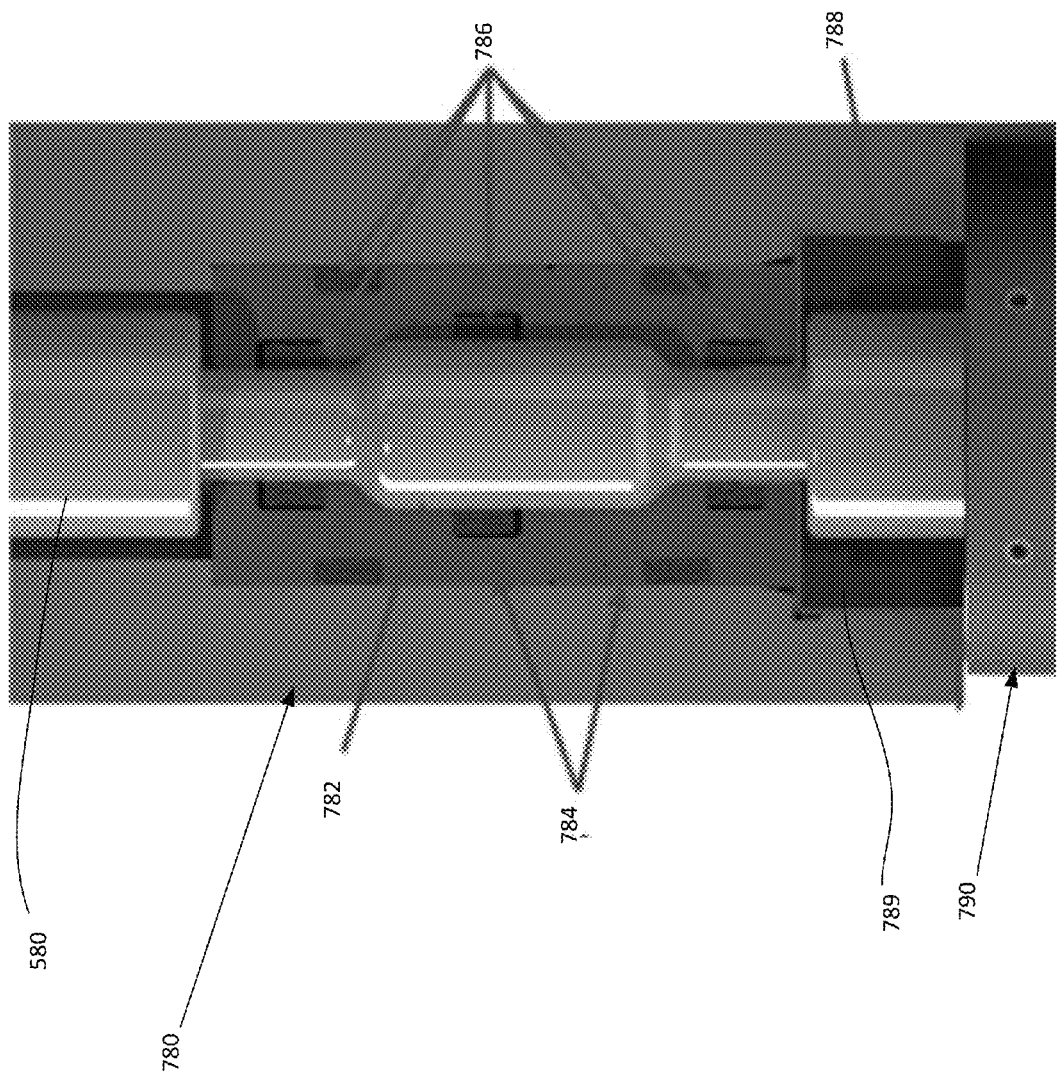
FIG. 22 provides a detailed, cross-section view of the pressure boundary of the tubing hanger penetrator module seal assembly in accordance with the first embodiment of the present invention.

With reference now to FIG. 22, a detailed, cross-section view of the pressure boundary 788 at the upper portion 790 of the tubing hanger penetrator module seal assembly 780 is provided. Pressure integrity between the production bore 830 and cavity 770 of the tubing hanger 600 is provided by the tubing hanger penetrator module seal assembly 780 at the primary pressure boundary 788. The tubing hanger penetrator module consists of two metallic shells 784, a thermoplastic penetrator 782 and elastomeric seals 786 with overmolded anti-extrusion springs. A threaded nut 789 provides mechanical retention for the penetrator module seal assembly 780. The seals 786 may be seals qualified per Norsk Sokkels Konkuranseposisjon ("NORSOK") M-710, ISO 10423, or other relevant industry standards. In one embodiment the seal 786 material is a fluorocarbon elastomer with an advertised temperature rating of <−20° C. to >+121° C., excellent RGD resistance and compatible for operating at pressures up to 15,000 psi. The tubing hanger penetrator module seal assembly 780 is located deep enough in the tubing hanger 600 as to be thermally isolated from the wellhead plug subassembly 700A in the event of any external fire or explosion. This provides for the use of conventional thermoplastic elements in the tubing hanger penetrator module seal assembly 780.

Figure 23:
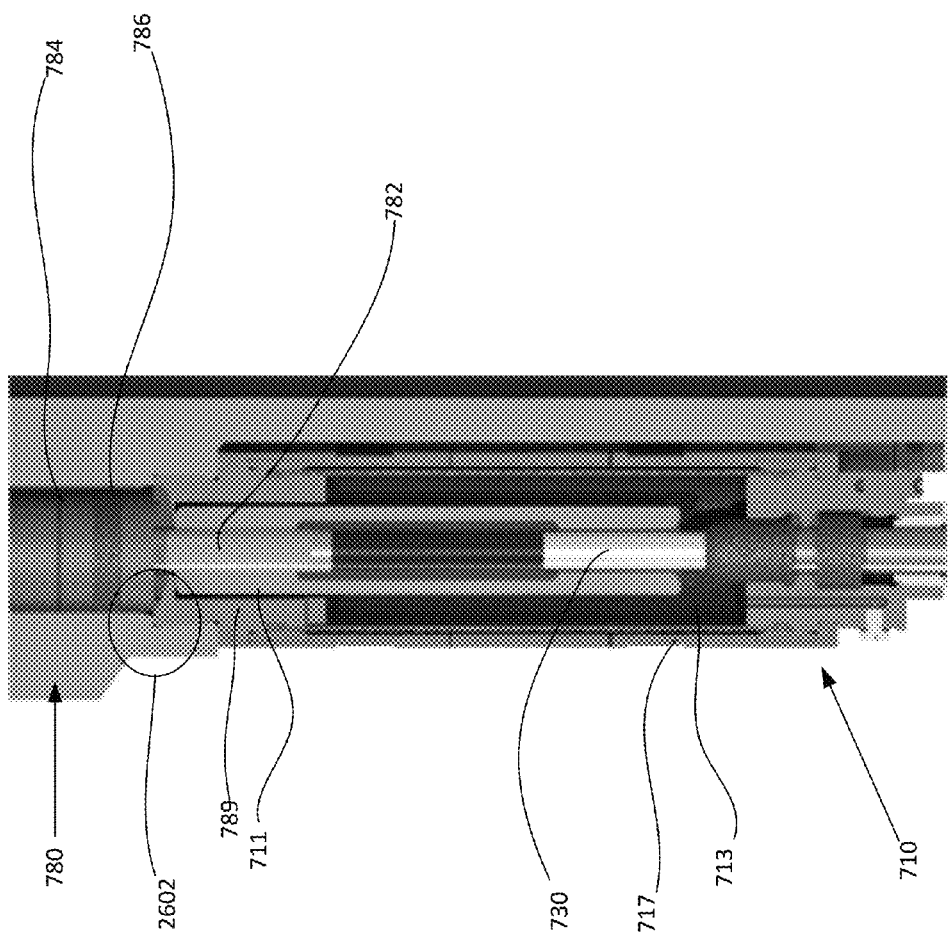
FIG. 23 provides a cross-section view of a pressure-balanced cable termination attached to the tubing hanger penetrator module and tubing hanger in accordance with the first embodiment of the present invention.

With reference now to FIG. 23, a cross-section view of a tubing hanger penetrator module seal assembly 780, penetrator sealing module 710 and tubing hanger 600 is provided. The boots 580 and 711 on the penetrator pin 782 join the pigtail 570 with the ESP cable breakout 730. The ESP cable breakout 730 enters the bottom of the penetrator sealing module 710 and is joined in the termination volume 713 of the penetrator sealing module 710 by the sealing boot 711. The penetrator pin 782 with metallic shells 784 and seals 786 form the pressure boundary between the tubing hanger 600 and the production bore 830. The termination volume 713 of the sealing module 710 that is enclosed by outer shell 717 may be filled with oil or an other suitable viscous fluid to maintain the integrity of the sealing module 710.

Figure 24:
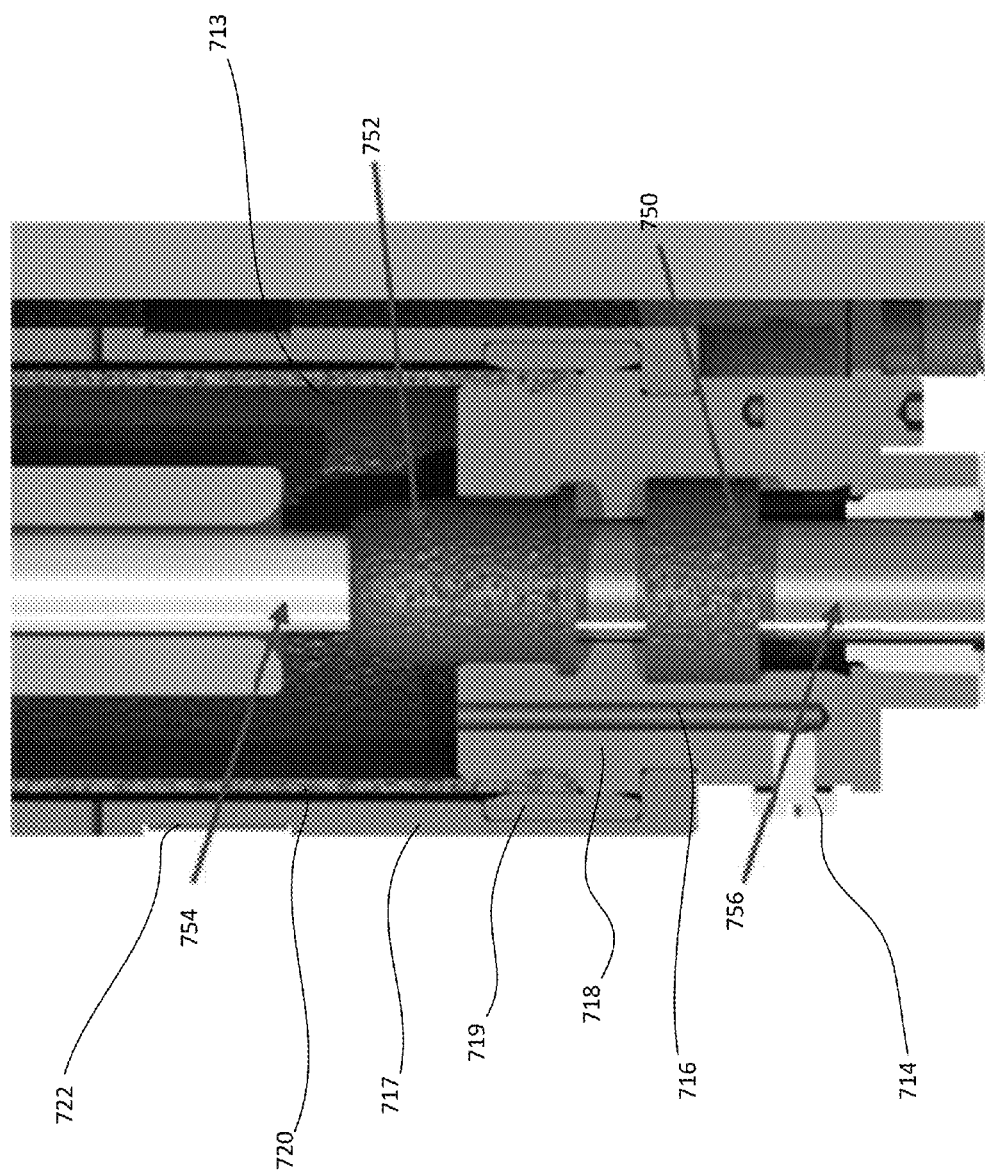
FIG. 24 provides a cross-section view of an ESP cable sealing configuration in accordance with the first embodiment of the present invention.

With reference now to FIG. 24, a cross-section view of an ESP cable sealing configuration is provided. The ESP cable 730 is sealed by two elastomeric components 750 and 752 at the entry to the termination volume 713. The first sealing element 750 is a gland seal, which prevents fluid ingress into the termination volume 713 along the outer sheath 754 of the cable. The second sealing element is a boot seal 752 which covers the end of the lead sheath 756, preventing fluid egress from the cable termination housing 710 into the interstices between the layers of the ESP cable 730. A bolt 714 retains the fluid within the termination volume 713 of the termination housing 710 and fluid may be added or removed from the volume 713 through the oil fill port 716. The outer wall 717 of the clamshell design is disposed around the termination housing end 718 of the termination housing 710.

The termination housing end 718 of the tubing hanger penetrator module 700 is a clamshell design. The clamshell design eliminates small fasteners that could become loose during operation and fall into the production bore 830. Additional benefits of the clamshell design include easier installation of the termination housing 710, reduced height required for installation and independent alignment of the housing relative 717 to the thread form on the tubing hanger 600. This independence allows the oil fill port 716 to be readily accessible, regardless of the orientation of the thread in the tubing hanger 600.

The bladder 720 is sealed by a set of two sealing rings, such as sealing ring 719 at the bottom of the bladder 720, which are axially retained by the clamshell housing 717. The clamshell housing 717 is secured by a pair of cable bands 722.

While the invention has been described by reference to certain preferred embodiments, it should be understood that numerous changes could be made within the spirit and scope of the inventive concept described. In implementation, the inventive concepts may be automatically or semi-automatically, i.e., with some degree of human intervention, performed. Also, the present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

What is claimed is:

1. A fire-resistant electrical penetrator comprising:
   a body having a first and a second end, the body comprising an insulator;
   a conductor disposed within the body;
   a metallic sealing element disposed about and fixedly secured to a middle of the body and adapted to be used in a metal joining process; and
   a set of metallic end sleeves disposed at the first and second ends of the cylindrical body, joining the conductor to the body;
   wherein the conductor extends beyond the first and second ends of the body.

2. The penetrator of claim 1 wherein the body, sealing element, the metallic end sleeves, and conductor are joined by a combination of brazing and welding processes.

3. The penetrator of claim 1 wherein the conductor is a gold-plated, two-piece copper conductor.

4. The penetrator of claim 1 wherein the penetrator is assembled in a high vacuum or dry nitrogen environment whereby air is purged from a volume formed within the ceramic electrical penetrator.

5. The penetrator of claim 1 wherein the body is substantially cylindrical.

6. The penetrator of claim 1 wherein the insulator comprises a ceramic insulator.

7. The penetrator of claim 1 wherein additional fire and thermal resistance for the penetrator is provided by convective cooling, passive insulation, or heat-shielding.

8. A fire-resistant feedthrough assembly comprising:
a set of insulated electrical penetrators disposed within a penetrator module, the penetrator module disposed within a penetrator housing module, the penetrator housing module having a first flange interface;
a spool adapter having a side interface and a second flange interface, the spool adapter joined to the first flange interface of the penetrator housing module by the second flange interface, wherein a pressure containment boundary is formed behind the penetrator module; and
wherein the side interface of the spool adapter is adapted to mount to a bulkhead.

9. The assembly of claim 8 wherein the insulated electrical penetrators are welded to the penetrator module and wherein the penetrator module is welded to the penetrator housing module.

10. The assembly of claim 8 wherein each insulated electrical penetrator in the set of insulated electrical penetrators comprises:
a body having a first and a second end, the body comprising an insulator;
a conductor disposed within the body;
a sealing element disposed about the body; and a set of metallic end sleeves disposed at the first and second ends of the body, joining the conductor to the body;
wherein the conductor extends beyond the first and second ends of the body.

11. The assembly of claim 10 wherein the body of the insulated electrical penetrator is substantially cylindrical and wherein the insulator comprises a ceramic insulator.

12. The assembly of claim 8 further comprising an electrical receptacle adapted to mate with the penetrator housing module and form an operative electrical connection with the set of insulated electrical penetrators.

13. The assembly of claim 12 wherein the electrical receptacle further comprises a set of components comprising:
a locking sleeve;
a termination shell;
a cable gland;
a power cable pigtail; and
a socket contact subassembly.

14. The assembly of claim 13 wherein a set of clearances between the set of components of the electrical receptacle prevent the propagation of an explosion or flame front from within the electrical receptacle.

15. The assembly of claim 8 wherein the bulkhead comprises a secondary pressure barrier, the secondary pressure barrier comprising a tree cap.

16. The assembly of claim 8 wherein additional fire and thermal resistance for the set of insulated electrical penetrators is provided by convective cooling, passive insulation, or heat-shielding.

17. A fire-resistant feedthrough assembly comprising:
a set of insulated electrical penetrators disposed within a penetrator module, the penetrator module disposed within a penetrator housing module, the penetrator housing module having a first flange interface;
a spool adapter having a side interface adapted to mount to a bulkhead and a second flange interface, the spool adapter joined to the first flange interface of the penetrator housing module by the second flange interface, wherein a pressure containment boundary is formed behind the penetrator module; and the penetrator module further comprising an internal penetrator seal assembly comprising:
a set of metallic shells disposed about the set of electrical penetrators; and
a set of seals disposed within the set of metallic shells and about each electrical penetrator of the set of electrical penetrators.

18. The assembly of claim 17 wherein the insulated electrical penetrators are welded to the penetrator module and wherein the penetrator module is welded to the penetrator housing.

19. The assembly of claim 17 wherein each insulated electrical penetrator in the set of insulated electrical penetrators comprises:
a body having a first and a second end, the body comprising an insulator;
a conductor disposed within the body;
a sealing element disposed about the body; and a set of metallic end sleeves disposed at the first and second ends of the body, joining the conductor to the body;
wherein the conductor extends beyond the first and second ends of the body.

20. The assembly of claim 19 wherein the body of the insulated electrical penetrator is substantially cylindrical and wherein the insulator comprises a ceramic insulator.

21. The assembly of claim 17 further comprising an electrical receptacle adapted to mate with the penetrator housing module and form an operative electrical connection with the set of insulated electrical penetrators.

22. The assembly of claim 21 wherein the electrical receptacle further comprises a set of components comprising:
a locking sleeve;
a termination shell;
a cable gland;
a power cable pigtail; and
a socket contact subassembly.

23. The assembly of claim 21 wherein a set of clearances between the set of components of the electrical receptacle prevent the propagation of an explosion or flame front from within the electrical receptacle.

24. The assembly of claim 17 wherein the internal penetrator seal assembly is disposed within an equipment assembly and thermally isolated from the penetrator module.

25. The assembly of claim 17 wherein the internal penetrator seal assembly is adapted to provide a pressure barrier for a differential pressure.

26. The assembly of claim 17 wherein the penetrator of the internal penetrator seal assembly comprises a thermoplastic penetrator.

27. The assembly of claim 17 wherein the set of seals of the internal penetrator seal assembly comprise elastomeric seals with overmolded anti-extrusion springs.

28. The assembly of claim 17 wherein the internal penetrator seal assembly is secured by a threaded nut.

29. The assembly of claim 17 wherein the side interface is disposed on the bulkhead, the bulkhead comprising a tree cap and forming a pressure barrier on a casing.

30. The assembly of claim 17 wherein additional fire and thermal resistance for the set of insulated electrical penetrators is provided by convective cooling, passive insulation, or heat-shielding.

* * * * *